US012133123B2

(12) United States Patent
Liu

(10) Patent No.: US 12,133,123 B2
(45) Date of Patent: Oct. 29, 2024

(54) METHOD AND APPARATUS FOR CONNECTION RECONFIGURATION

(71) Applicant: Telefonaktiebolaget LM Ericsson (publ), Stockholm (SE)

(72) Inventor: Jiyan Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 17/628,596

(22) PCT Filed: Jul. 24, 2019

(86) PCT No.: PCT/CN2019/097486
§ 371 (c)(1),
(2) Date: Jan. 20, 2022

(87) PCT Pub. No.: WO2021/012213
PCT Pub. Date: Jan. 28, 2021

(65) Prior Publication Data
US 2022/0256411 A1    Aug. 11, 2022

(51) Int. Cl.
*H04W 36/00* (2009.01)
*H04W 36/08* (2009.01)

(52) U.S. Cl.
CPC ... *H04W 36/0069* (2018.08); *H04W 36/0058* (2018.08); *H04W 36/08* (2013.01)

(58) Field of Classification Search
CPC ......... H04W 36/0069; H04W 36/0058; H04W 36/08; H04W 36/30; H04W 36/00;
(Continued)

(56) References Cited

U.S. PATENT DOCUMENTS 11,012,863 B1 * 5/2021 Marupaduga et al. ..................... H04W 16/14
11,102,669 B2 * 8/2021 Tsuboi et al. ......... H04W 24/10
(Continued)

FOREIGN PATENT DOCUMENTS

CN 109168179 A 1/2019
WO 2019130048 A1 7/2019

OTHER PUBLICATIONS (WO 2019167844 A1), published to Harada et al., on Sep. 6, 2019, discloses—This user device communicates with a first base station device that uses a first radio access technology (RAT) and with a second base station device that uses a second RAT (see abstract). (Year: 2019).*

(Continued)

*Primary Examiner* — Meless N Zewdu
(74) *Attorney, Agent, or Firm* — Sage Patent Group

(57) ABSTRACT

The present disclosure provides a method at a first master node in dual connectivity. The dual connectivity involves a first Radio Access Technology (RAT) and a second RAT. The method includes receiving a first measurement report for the second RAT from a terminal device, and receiving a second measurement report for the first RAT from the terminal device. The method further includes receiving a secondary node reconfiguration message from a first secondary node. The secondary node reconfiguration message has been generated in response to the first measurement report. The method further includes sending a Radio Resource Control (RRC) Connection Reconfiguration message to the terminal device. The RRC Connection Reconfiguration message includes information on master node reconfiguration under the first RAT and information on secondary node reconfiguration under the second RAT. Therefore, the resource allocated to signaling messages may (Continued)

be reduced, and the burden on the terminal device may be alleviated.

19 Claims, 15 Drawing Sheets

(58) Field of Classification Search
CPC ......... H04W 36/0085; H04W 36/0088; H04W 36/0094; H04W 24/00; H04W 24/10; H04W 28/0864; H04W 28/0861; H04W 28/086; H04W 36/023; H04W 36/02; H04W 36/00838; H04W 88/00; H04W 88/02; H04W 88/08; H04W 88/10; H04W 92/00; H04W 92/20; H04W 92/02; H04W 36/00698; H04W 36/18; H04W 36/26; H04W 36/28; H04W 36/302; H04W 36/305; H04W 36/34; H04W 36/36; H04W 36/362; H04W 8/08; H04W 36/130027; H04W 38/00835; H04W 36/13; H04W 36/14; H04W 36/144; G01S 5/0054; G01S 5/0063; G01S 5/0072; G01S 5/00; G01S 5/0018; G01S 5/0009; G01S 5/0027; G01S 5/0036
See application file for complete search history.

(56) References Cited

U.S. PATENT DOCUMENTS

| | | | |
|---|---|---|---|
| 11,184,057 B2* | 11/2021 | Jung et al. | H04B 7/043 |
| 2013/0143566 A1* | 6/2013 | Kubota et al. | H04W 36/0061 |
| 2014/0192771 A1* | 7/2014 | Jung et al. | H04W 36/08 |
| 2015/0036658 A1* | 2/2015 | Mochizuki et al. | H04B 7/024 |
| 2015/0049707 A1* | 2/2015 | Vajapeyam et al. | H04W 76/045 |
| 2015/0264621 A1* | 9/2015 | Sivanesan et al. | H04W 36/32 |
| 2017/0331670 A1* | 11/2017 | Parkvall et al. | H02L 41/0233 |
| 2018/0368029 A1 | 12/2018 | Wu | |
| 2019/0215740 A1* | 7/2019 | Wu | H04W 36/0077 |
| 2019/0281650 A1* | 9/2019 | Wu | H04W 76/27 |
| 2020/0128453 A1* | 4/2020 | Teyeb et al. | H04W 36/00 |
| 2021/0250825 A1* | 8/2021 | Purkayastha et al. | H04W 36/0069 |

OTHER PUBLICATIONS (KR 102282835 B1) >>> published on Jul. 27, 2021, discloses—Mobility Enhancements for Cellular Communications (see title). (Year: 2021).*
(JP 6572976 B2) >>> Wireless Station System, Wireless Terminal, Wireless Station, and Methods Thereof (title) (Year: 2019).*
(WO 2020024301 A1) >>> Method and Device for Ensuring Data Transmission Reliability, and Network Apparatus (see title) (Year: 2020).*
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.5.1, Apr. 2019, 3GPP Organizational Partners, 948 pages.
Author Unknown, "Technical Specification Group Radio Access Network; Evolved Universal Terrestrial Radio Access Nework (E-UTRAN); X2 application protocol (X2AP) (Release 15)," Technical Specification 36.423, Version 15.5.0, Mar. 2019, 3GPP Organizational Partners, 414 pages.
Author Unknown, "Technical Specification Group Radio Access Network; Evolved Universal Terrestrial Radio Access (E-UTRA) and NR; Multi-Connectivity; Stage 2 (Release 15)," Technical Specification 37.340, Version 15.6.0, Jun. 2019, 3GPP Organizational Partners, 69 pages.
Author Unknown, "Technical Specification Group Radio Access Network; NR; Radio Resource Control (RRC) protocol specification (Release 15)," Technical Specification 38.331, Version 15.5.1, Apr. 2019, 3GPP Organizational Partners, 491 pages.
Huawei, et al., "R2-1907423: Handover based on DC for 0ms interruption," 3GPP TSG-RAN WG2 #106, May 13-17, 2019, Reno, Nevada, 3 pages.
International Search Report and Written Opinion for International Patent Application No. PCT/CN2019/097486, mailed Apr. 22, 2020, 9 pages.

* cited by examiner

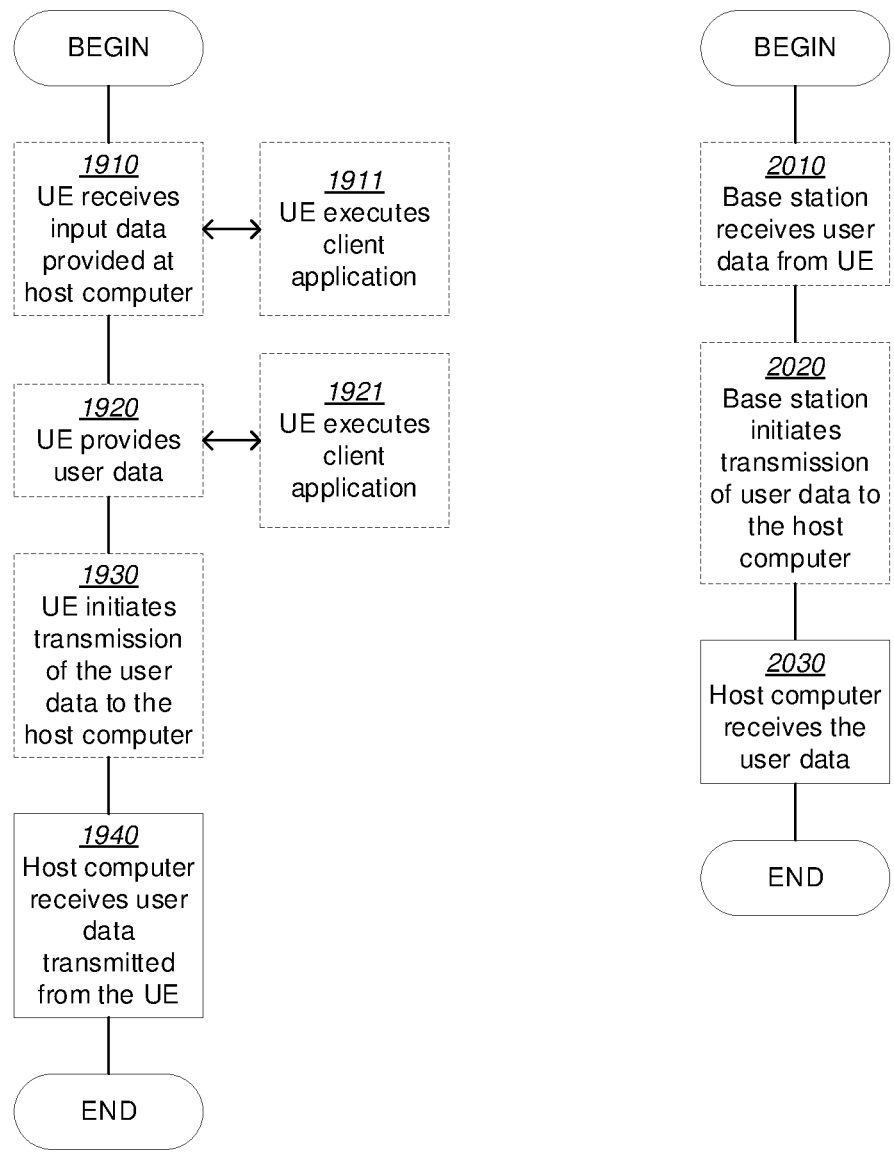

METHOD AND APPARATUS FOR CONNECTION RECONFIGURATION

This application is a 35 U.S.C. § 371 national phase filing of International Application No. PCT/CN2019/097486, filed Jul. 24, 2019, the disclosure of which is incorporated herein by reference in its entirety.

TECHNICAL FIELD

The present disclosure relates to wireless communications, and more particularly, to a method and an apparatus for connection reconfiguration in dual connectivity technology.

BACKGROUND

This section introduces aspects that may facilitate a better understanding of the disclosure. Accordingly, the statements of this section are to be read in this light and are not to be understood as admissions about what is in the prior art or what is not in the prior art.

In dual connectivity technology, more than one Radio Access Technology (RAT) is utilized. For example, in some Non-Standalone (NSA) systems for transition from 4G systems to 5G systems, New Radio (NR) base stations and Long Term Evolution (LTE) base stations work together with an NR or LTE core network.

In such dual connectivity technology, both NR mobility for handover from an NR cell to another NR cell and LTE mobility for handover from an LTE cell to another LTE cell can occur. The NR mobility is triggered by an NR measurement report, and a Radio Resource Control (RRC) Connection Reconfiguration message will be sent to the terminal device in relation to the NR mobility. On the other hand, LTE mobility is triggered by an LTE measurement report, and an RRC Connection Reconfiguration message will be sent to the terminal device in relation to the LTE mobility.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to related arts, if mobility is triggered respectively by measurement reports under different RATs, resources allocated to signaling messages will be increased and the burden on the terminal device will be heavy.

It is thus an object of the present disclosure to provide a method and an apparatus for connection reconfiguration in dual connectivity technology.

In a first aspect of the present disclosure, a method at a first master node in dual connectivity is provided. The dual connectivity involves a first Radio Access Technology (RAT) and a second RAT. The first master node is operable under the first RAT. The method includes receiving a first measurement report for the second RAT from a terminal device, and receiving a second measurement report for the first RAT from the terminal device. The method further includes receiving a secondary node reconfiguration message from a first secondary node. The secondary node reconfiguration message has been generated in response to the first measurement report. The first secondary node is operable according to the second RAT. The method further includes sending a Radio Resource Control (RRC) Connection Reconfiguration message to the terminal device. The RRC Connection Reconfiguration message includes information on master node reconfiguration under the first RAT and information on secondary node reconfiguration under the second RAT.

In an embodiment, the method may further include transferring the first measurement report to the first secondary node.

In an embodiment, the master node reconfiguration may include reconfiguration for master node handover from the first master node to a second master node. The second master node may be operable under the first RAT.

In an embodiment, the method may further include sending a handover request to the second master node in response to the second measurement report, and receiving a handover request acknowledge from the second master node. The handover request acknowledge may include the information on the secondary node reconfiguration.

In an embodiment, the secondary node reconfiguration may include reconfiguration for secondary node handover within the first secondary node. The information on the secondary node reconfiguration may include information on a new serving secondary cell of the first secondary node which is determined by the first secondary node.

In an embodiment, the secondary node reconfiguration may include reconfiguration for secondary node handover from the first secondary node to a second secondary node. The information on the secondary node reconfiguration may include information on a new serving secondary cell of the second secondary node which is determined by the second secondary node. The second secondary node may be operable under the second RAT.

In an embodiment, the first master node and the second master node may be a same network device.

In an embodiment, the master node reconfiguration may include reconfiguration for master node handover within the first master node.

In an embodiment, the secondary node reconfiguration may include reconfiguration for secondary node handover within the first secondary node. The information on the secondary node reconfiguration may include information on a new serving secondary cell of the first secondary node which is determined by the first secondary node.

In an embodiment, the second measurement report may include a measurement under the first RAT and a measurement under the second RAT. The method may further include sending a secondary node reconfiguration request to the first secondary node in response to the second measurement report. The secondary node reconfiguration request may include a list of candidate secondary cells. The method may further include receiving a secondary node reconfiguration request acknowledge from the first secondary node. The secondary node reconfiguration request acknowledge may include the information on the new serving secondary cell.

In an embodiment, the secondary node reconfiguration may include reconfiguration for secondary node handover from the first secondary node to a second secondary node. The information on the secondary node reconfiguration may include information on a new serving secondary cell of the second secondary node which is determined by the second secondary node. The second secondary node may be operable under the second RAT.

In an embodiment, the second measurement report may include a measurement under the first RAT and a measurement under the second RAT. The method may further include sending a secondary node reconfiguration request to the second secondary node in response to the second measurement report. The secondary node reconfiguration request may include a list of candidate secondary cells. The method may further include receiving a secondary node reconfiguration request acknowledge from the second secondary node. The secondary node reconfiguration request acknowledge may include the information on the new serving secondary cell.

In an embodiment, the method may further include sending, to the terminal device in response to the first measurement report, no RRC Connection Reconfiguration message which includes only the information on the secondary node reconfiguration under the second RAT without the information on the master node reconfiguration under the first RAT.

In an embodiment, the first RAT may be Long Term Evolution (LTE) system, and the second RAT may be New Radio (NR) system. In addition, the first measurement report may be included in a Radio Resource Control (RRC) Upper Link (UL) Information Transfer Multiple RAT Dual Connectivity (MRDC) message and may include a report of Event A3 or Event A5 under NR system. In addition, the second measurement report may be an RRC measurement report, and may include a report of Event A3 or Event A5 under LTE system and a report of Event A3 or Event A5 under NR system.

In an embodiment, the secondary node reconfiguration message may be an SgNB Modification Required message.

In an embodiment, the secondary node reconfiguration message may be an SgNB Change Required message.

In an embodiment, the secondary node reconfiguration request may be an SgNB Addition Request message or an SgNB Modification Request message, and the secondary node reconfiguration request acknowledge may be an SgNB Addition Request Acknowledge message or an SgNB Modification Request Acknowledge message.

In an embodiment, the secondary node reconfiguration request may be an SgNB Addition Request message, and the secondary node reconfiguration request acknowledge may be an SgNB Addition Request Acknowledge message.

In a second aspect of the present disclosure, a method at a first secondary node in dual connectivity is provided. The dual connectivity involves a first Radio Access Technology (RAT) and a second RAT. The first secondary node is operable under the second RAT. The method includes: receiving a first measurement report for the second RAT, the first measurement report being originated from a terminal device, and determining a candidate new serving secondary cell in response to the first measurement report. The method further includes receiving a secondary node reconfiguration request from a second master node. The secondary node reconfiguration request includes a list of candidate secondary cells. The second master node is operable according to the first RAT. The method further includes selecting a cell as a new serving secondary cell from the candidate new serving secondary cell and the list of candidate secondary cells.

In an embodiment, the method may further include sending a secondary node reconfiguration message to a first master node in response to the first measurement report. The first master node may be operable according to the first RAT.

In an embodiment, the method may further include avoiding sending an error notice to the first master node, if no secondary node reconfiguration request is received from the first master node in response to the secondary node reconfiguration message.

In an embodiment, the method may further include sending, to the terminal device in response to the first measurement report, no Radio Resource Control (RRC) Connection Reconfiguration message which includes the information on the secondary node reconfiguration.

In an embodiment, the method may further include sending a secondary node reconfiguration request acknowledge to the second master node. The secondary node reconfiguration request acknowledge may include the information on the selected new serving secondary cell.

In an embodiment, the first master node and the second master node may be a same network device.

In a third aspect of the present disclosure, an apparatus is provided. The apparatus includes a transceiver, a processor and a memory. The memory includes instructions executable by the processor whereby the apparatus is operative to perform the method according to any of the above first aspect and the above second aspect.

In a fourth aspect of the present disclosure, a computer readable storage medium is provided. The computer readable storage medium has computer program instructions stored thereon. The computer program instructions, when executed by a processor in an apparatus, cause the apparatus to perform the method according to any of the above first aspect and the above second aspect.

In a fifth aspect of the present disclosure, a computer program is provided. The computer program include instructions which, when executed by a processor of an apparatus, cause the apparatus to perform the method according to any of the above first aspect and the above second aspect.

With the embodiments of the present disclosure, the resource allocated to signaling messages may be reduced, the burden on the terminal device may be alleviated, and therefore the throughput of the communication system may be increased.

BRIEF DESCRIPTION OF THE DRAWINGS

The above and other objects, features and advantages will be more apparent from the following description of embodiments with reference to the figures, in which:

FIGS. 17 to 20 are flowcharts illustrating methods implemented in a communication system including a host computer, a base station and a user equipment.

DETAILED DESCRIPTION

Figure 1:
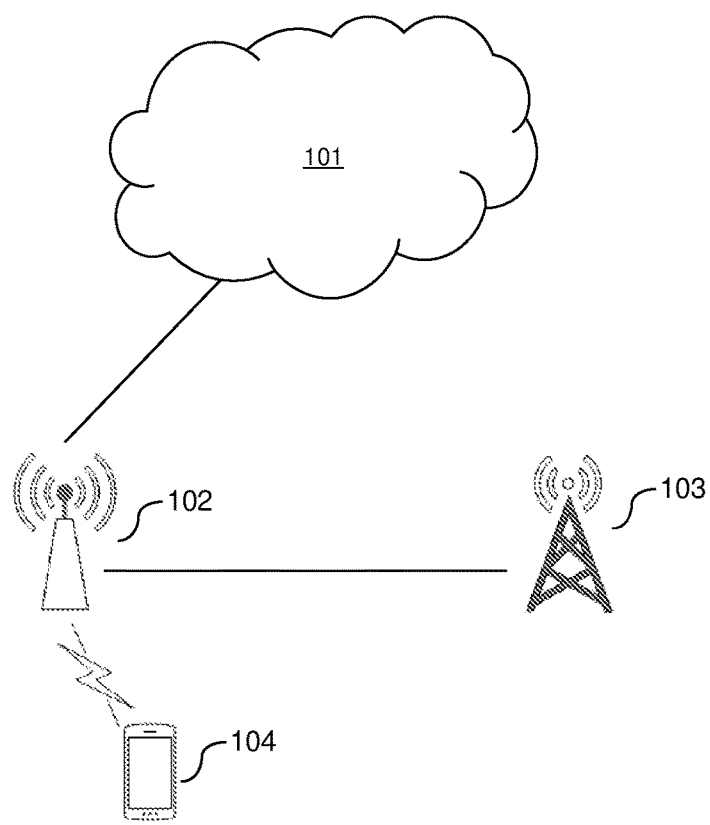
FIG. 1 is a schematic diagram showing an example of a communication system utilizing dual connectivity according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, "downlink" refers to a transmission from a network device to a terminal device, and "uplink" refers to a transmission in an opposite direction.

References in the specification to "one embodiment", "an embodiment", "an example", "some embodiments" and the like indicate that the embodiment or example described may include a particular feature, structure, or characteristic, but it is not necessary that every embodiment or example includes the particular feature, structure, or characteristic. Moreover, such phrases are not necessarily referring to the same embodiment or example. Further, when a particular feature, structure, or characteristic is described in connection with an embodiment or an example, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a schematic diagram showing an example of a communication system utilizing dual connectivity according to an embodiment of the present disclosure. In the example shown in FIG. 1, a master node (MN) 102 operable under a first RAT is connected to a core network 101. In addition, a secondary node (SN) 103 operable under a second RAT is connected to the core network via the master node 102. Therefore the SN 103 may communicate user data and/or control signals with the core network via the MN 102. Optionally, the SN 103 may also be additionally connected directly to the core network 101 to communicate user data therewith. A terminal device 104 may have access to and communication user data and/or control signals with the SN 103 via the MN 102. Each of the MN 102 and the SN 103 may be a network device (e.g. an eNB or a gNB) as described in the above.

In an example, the core network 101 may be a 4G (LTE) core network, the MN 102 may be an eNB or a gNB operable under the LTE technology, and the SN 103 may be a gNB operable under the NR technology. This example can be used in Option 3, Option 3a and Option 3x of the NSA for the transition from the 4G systems to the 5G systems, in which 5G base stations communicate user data and/or control signals with the 4G core network via 4G base stations.

Figure 2:
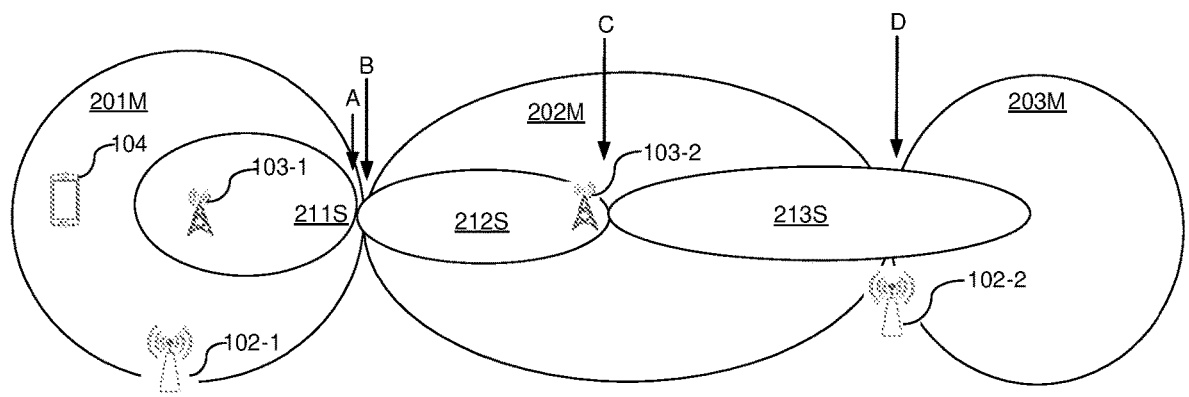
FIG. 2 is a schematic diagram showing an example of handover between master cells and/or secondary cells according to an embodiment of the present disclosure.

According to the example shown in FIG. 1, each of the MN 102 and the SN 103 has its respective cells. FIG. 2 is a schematic diagram showing an example of handover between master cells and/or secondary cells according to an embodiment of the present disclosure. In the example shown in FIG. 2, a master cell 201M may be supported by an MN 102-1, and master cells 202M and 203M may be supported by an MN 102-2. In addition, a secondary cell 211S may be supported by an SN 103-1, and secondary cells 212S and 213S may be supported by an SN 103-2. If a terminal device 104 moves through these cells (from left to right in FIG. 2), the following inter-cell handover may occur.

When the terminal device 104 moves to the location A, an inter-SN handover (cell change) from the secondary cell 211S supported by the SN 103-1 to the secondary cell 212S supported by the SN 103-2 may be required. Soon after this, when the terminal device 104 moves to the location B, an inter-MN handover from the master cell 201M supported by the MN 102-1 to the master cell 202M supported by the MN 102-2 may be required. Then when the terminal device 104 moves to the location C, an intra-SN handover from the secondary cell 212S to the secondary cell 213S within the SN 103-2 may be required. Then when the terminal device 104 moves to the location D, an intra-MN handover from the master cell 202M to the master cell 203M within the MN 102-2 may be required.

In the example shown in FIG. 2, the mobility for handover from a master cell to another may be triggered by a measurement report for the first RAT, and the mobility for handover from a secondary cell to another is triggered by a measurement report for the second RAT. In this way, separate RRC Connection Reconfiguration messages will be sent to the terminal device respectively in response to the decisions to make the respective handover operations. For example, at the location A, SN handover will be performed and an RRC Connection Reconfiguration message will be sent to the terminal device which includes information on SN reconfiguration under the second RAT, while at the location B, MN handover will be performed and another RRC Connection Reconfiguration message will be sent to the terminal device which includes information on MN reconfiguration under the first RAT.

If the secondary cell change (SN handover under the second RAT) happens very soon after the master cell change (MN handover under the first RAT), the RRC Connection Reconfiguration messages will be sent twice in a short time, and there will be considerable resource allocated to the signaling messages. In this case, the terminal device has to process the RRC Connection Reconfiguration message twice.

Furthermore, in some cases, the measurement report for the first RAT will also include a measurement under the second RAT. In such cases, the measurement report for the second RAT might be less useful if it is followed closely by the second measurement report for the first RAT. Even in this case, the terminal device still has to perform the random access for the second RAT twice.

Figure 3:
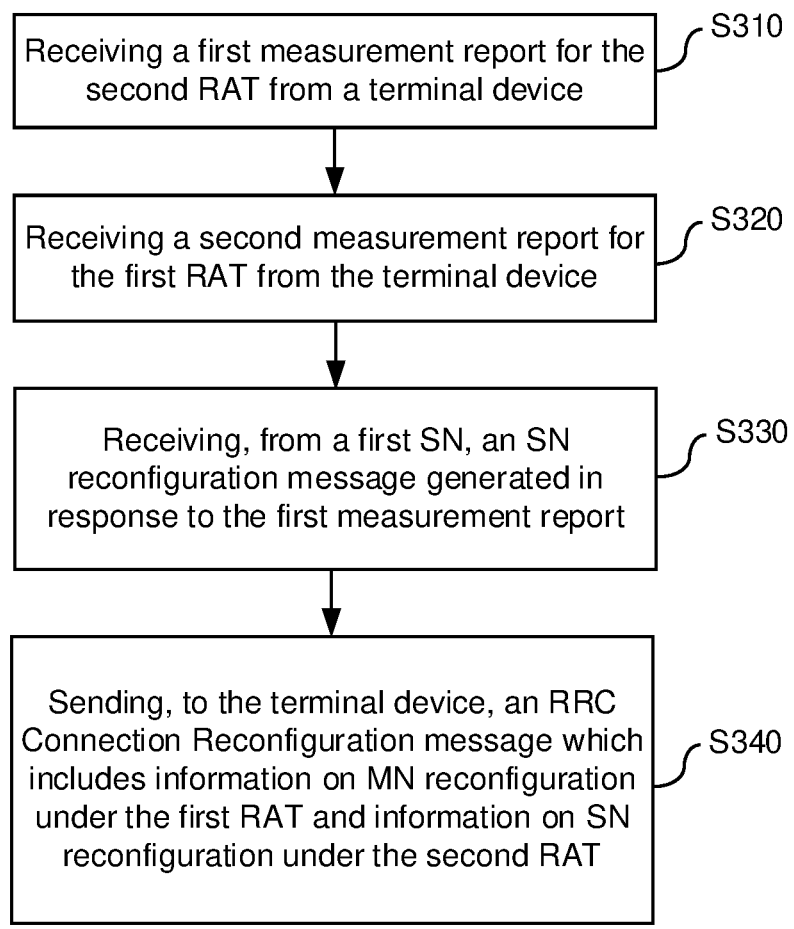
FIG. 3 is a flowchart showing an example of a method for connection reconfiguration at a first master node in a dual connectivity system according to an embodiment of the present disclosure.

FIG. 3 is a flowchart showing an example of a method for connection reconfiguration at a first master node (a first MN) in a dual connectivity system according to an embodiment of the present disclosure. The dual connectivity system involves a first RAT and a second RAT. The first MN is operable under the first RAT.

As shown in FIG. 3, the method performed at the first MN may include a block S310 of receiving a first measurement report for the second RAT from a terminal device, and a block S320 of receiving a second measurement report for the first RAT from the terminal device. In an example, the block S320 is performed after the block S310. The method may further include a block S330 of receiving an SN reconfiguration message from a first secondary node (a first SN). The first SN is operable according to the second RAT and is communicatively connected with the first MN. The SN reconfiguration message has been generated by the first SN in response to the first measurement report. The method may further include a block S340 of sending an RRC Connection Reconfiguration message to the terminal device. The RRC Connection Reconfiguration message includes both information on MN reconfiguration under the first RAT and information on SN reconfiguration under the second RAT.

In some examples, the first RAT may be LTE, and the second RAT may be NR. The first MN (and any other MN in the present disclosure) may be an eNB or a gNB (Master gNB, MgNB) operable under LTE, and the first SN (and any other SN in the present disclosure) may be a gNB (Secondary gNB, SgNB) operable under NR. In this way, the method shown in FIG. 3 may be applied to an NSA system for transition from 4G to 5G (e.g. Option 3, Option 3a or Option 3x). It is to be noted that the present disclosure is not limited to such examples. In other examples, the first RAT may be NR and the second RAT may be LTE. In this case, the method shown in FIG. 3 may be applied to Option 4, Option 4a, Option 7, Option 7a or Option 7x of a different NSA system. Once there will be a new generation of communications standard, one or both of the first MN (and any other MN in the present disclosure) and the first SN (and any other SN in the present disclosure) may be a network device operable under a RAT of the new generation. In some examples of the present disclosure, the first MN is a source MN (S-MN) and the second MN is a target MN (T-MN) in MN handover. Similarly, in some examples of the present disclosure, the first SN is a source SN (S-SN) and the second SN is a target SN (T-SN) in SN handover. In some examples, the signaling messages between any two of the MNs and the SNs may be signaling messages for the X2 interface. The first MN and the second SN may be communicatively connected in the communication system in a manner shown in FIG. 1.

In some examples, the method shown in FIG. 3 may be a method performed in a case where there is no available Signaling Radio Bearer (e.g. SRB3) for the dual connectivity. In this case, any SN cannot receive data or messages directly from the terminal device, but an MN connected with the SN will transfer the data or messages from the terminal device to the SN. Therefore, the method shown in FIG. 3 may further include transferring the first measurement report to the first SN.

The method of the example shown in FIG. 3 will be described in more detail.

At block S310, the first MN receives a first measurement report for the second RAT from a terminal device.

The first measurement report includes a measurement under the second RAT. The first measurement report may include, for example, an NR measResult. In some examples, the first measurement report may include a measurement of service quality of a current serving secondary cell (also known as "primary secondary cell, PSCell") which is supported by the first SN. The first measurement report may further include a measurement of service quality of a neighbor secondary cell (e.g. bestneighbormeasresult of a best neighbor secondary cell), which is supported by the first SN or another SN (e.g. a second SN).

In an example, the first measurement report may include information that the neighbor secondary cell has a higher service quality than the current serving secondary cell. Alternatively, the first measurement report may include information that the service quality of the current serving secondary cell is lower than a threshold and the service quality of the neighbor secondary cell is higher than a threshold. For example, the first measurement report may include an Event A3 or Event A5 of an RRC Measurement Report under the second RAT, and may be conveyed in an RRC UL Information Transfer Multiple RAT Dual Connectivity (MRDC) message.

Then at block S320, the first MN receives a second measurement report for the first RAT from the terminal device.

In some examples, the second measurement report may be received within a short period of time after the first measurement report was received. The short period of time may be equal to the time from the timing when the first MN receives the first measurement report to the timing when the first MN receives the SN reconfiguration message. In other words, the second measurement report is received by the first MN earlier than the SN reconfiguration message is received by the first MN.

The second measurement report may include a measurement under the first RAT. The second measurement report may include, for example, a EUTRAN measResult. In some examples, the second measurement report may include a measurement of service quality of a current serving master cell which is supported by the first MN. The second measurement report may further include a measurement of service quality of a neighbor master cell (e.g. bestneighbormeasresult of a best neighbor master cell), which is supported by the first MN or another MN (e.g. a second MN).

In some examples, the second measurement report may include information that the neighbor master cell has a higher service quality than the current serving master cell. Alternatively, the second measurement report may include information that the service quality of the current serving master cell is lower than a threshold and the service quality of the neighbor master cell is higher than a threshold. For example, the second measurement report may include an Event A3 or Event A5 of an RRC Measurement Report under the first RAT.

In some examples, the second measurement report may only include the measurement under the first RAT. Alternatively, it is also possible that the second measurement report may not only include a measurement under the first RAT, but also include a measurement under the second RAT (e.g. NR measResult). In an example, the second measurement report also includes the measurement under the second RAT if a measurement configuration under the second RAT (e.g. NR measconfig) is configured and eventID is set to eventA3 or eventA4 or eventA5. The measurement under the second RAT included in the second measurement report may include a measurement of service quality of a current serving secondary cell and a measurement of service quality of a neighbor secondary cell. In this case, the first MN, in response to receiving the second measurement report, triggers not only MN handover but also SN handover.

In such examples, the second measurement report may also include information that the neighbor secondary cell has a higher service quality than the current serving secondary cell, or that the service quality of the current serving secondary cell is lower than a threshold and the service quality of the neighbor secondary cell is higher than a threshold. For example, the measurement under the second RAT included in the second measurement may include an Event A3 or Event A5 of an RRC Measurement Report under the second RAT.

In some cases, the measurement under the second RAT included in the second measurement may include similar information as the first measurement report, and thus the neighbor secondary cell in the second measurement report is the same as that in the first measurement report. In other cases, the measurement under the second RAT included in the second measurement may include different information as the first measurement report, and thus the neighbor secondary cell in the second measurement report may be different from that in the first measurement report.

At block S330, the first MN receives an SN reconfiguration message from the first SN. The first SN is operable according to the second RAT and is communicatively connected with the first MN. The SN reconfiguration message has been generated by the first SN in response to the first measurement report.

"Reconfiguration" herein means changing a serving cell for a MN or an SN. More specifically, MN reconfiguration means changing a serving master cell from a current serving master cell to a new serving master cell. In a case where the new serving master cell (which may be the neighbor master cell included in the second measurement report) is still supported by the first MN, the MN reconfiguration is an intra-MN reconfiguration. The intra-MN reconfiguration is a reconfiguration of a serving master cell for MN handover within the first MN ("intra-MN handover" or "intra-MN mobility"). In a case where the new serving master cell is supported by a second MN which is different from the first MN, the MN reconfiguration is an inter-MN reconfiguration. The inter-MN reconfiguration is a reconfiguration of a serving master cell for MN handover from the first MN to the second MN ("inter-MN handover" or "inter-MN mobility"). In some examples, the second MN may be a network device with similar structures and functions to the first MN.

Similarly, SN reconfiguration means changing a serving secondary cell from a current serving secondary cell to a new serving secondary cell. In a case where the new serving secondary cell (which may be the neighbor secondary cell included in the first measurement report or the second measurement report) is still supported by the first SN, the SN reconfiguration is an intra-SN reconfiguration. The intra-SN reconfiguration is a reconfiguration of a serving secondary cell for SN handover within the first SN ("intra-SN handover" or "intra-SN mobility"). In a case where the new serving secondary cell is supported by a second SN which is different from the first SN, the SN reconfiguration is an inter-SN reconfiguration. The inter-SN reconfiguration is a reconfiguration of a serving secondary cell for SN handover from the first SN to the second SN ("inter-SN handover" or "inter-SN mobility"). In some examples, the second SN may be a network device with similar structures and functions to the first SN.

An example of inter-MN handover is inter-MN handover procedure with/without MN-initiated SN change. The inter-MN handover procedure with/without MN-initiated SN change is used to transfer context data from the first MN (source MN) to a second MN (target MN) while the context at the SN is kept unchanged or moved to another SN. During an inter-MN handover, the second MN decides whether to keep or change the SN.

An example of intra-SN reconfiguration for intra-SN handover is an SN modification procedure. The SN modification procedure may be initiated either by the first MN or the first SN. The SN modification procedure is used to modify, establish or release bearer contexts, to transfer bearer contexts to and from the SN or to modify other properties of the UE context within the same SN. The SN modification procedure may also be used to transfer an NR RRC message from the first SN to the terminal device via the first MN, and to transfer the response from the terminal device via the first MN to the first SN (e.g. when Signaling Radio Bearer (e.g. SRB3) is not used).

An example of inter-SN reconfiguration for inter-SN handover is an SN change procedure. The SN change procedure is initiated either by the first MN or the first SN. The SN change procedure is used to transfer a UE context from the first SN to a second SN, and to change the Secondary Cell Group (SCG) configuration in the terminal device from the first SN to the second SN.

In some examples, the SN reconfiguration message is a message sent from the first SN indicating SN handover (inter-SN handover or intra-SN handover) is required. More specifically, the SN reconfiguration message is sent in response to a reconfiguration intention of the first SN to change a current serving secondary cell to another one. Such a reconfiguration intention is made in response to the first measurement report transferred from the first MN. For example, if the first measurement report includes information that a neighbor secondary cell has a higher service quality than the current serving secondary cell, or that the service quality of the current serving secondary cell is lower than a threshold and the service quality of the neighbor secondary cell is higher than a threshold, the first SN may have the reconfiguration intention to change the serving secondary cell from the current one to the neighbor secondary cell. The SN reconfiguration message may include at least information (e.g. cell identity) on the candidate new serving secondary cell (which may be the neighbor secondary cell included in the first measurement report). For intra-SN reconfiguration, the SN reconfiguration message may be an SgNB Modification Required message. For inter-SN reconfiguration, the SN reconfiguration message may be an SgNB Change Required message.

At block S340, the first MN sends an RRC Connection Reconfiguration message to the terminal device. The RRC Connection Reconfiguration message sent to the terminal device includes both information on MN reconfiguration under the first RAT and information on SN reconfiguration under the second RAT.

In some examples, the information on MN reconfiguration under the first RAT included in the RRC Connection Reconfiguration message may at least include mobility control information (e.g. mobilityControlInfo) under the first RAT, which may include at least information (e.g. a cell identification) of the new serving master cell for the MN handover. Similarly, the information on SN reconfiguration under the second RAT included in the same RRC Connection Reconfiguration message may at least include mobility control information (e.g. nr-SecondaryCellGroupConfig and/or nr-RadioBearerConfig2) under the second RAT, which may include at least information (e.g. a cell identification) of the new serving secondary cell for the SN handover.

In response to receiving the first measurement report and the second measurement report, instead of sending two separate RRC Connection Reconfiguration messages (with one including information on SN reconfiguration and the other including information on MN reconfiguration), in the method shown in FIG. 3, one RRC Connection Reconfiguration message which includes both the information on the SN reconfiguration and the information on the MN reconfiguration is sent to the terminal device. In other words, the two separate RRC Connection Reconfiguration messages are combined into one RRC Connection Reconfiguration message and is sent only once. In this way, the resource allocated to signaling messages may be reduced, the burden on the terminal device may be alleviated, and the throughput of the communication system may be increased.

Figure 4:
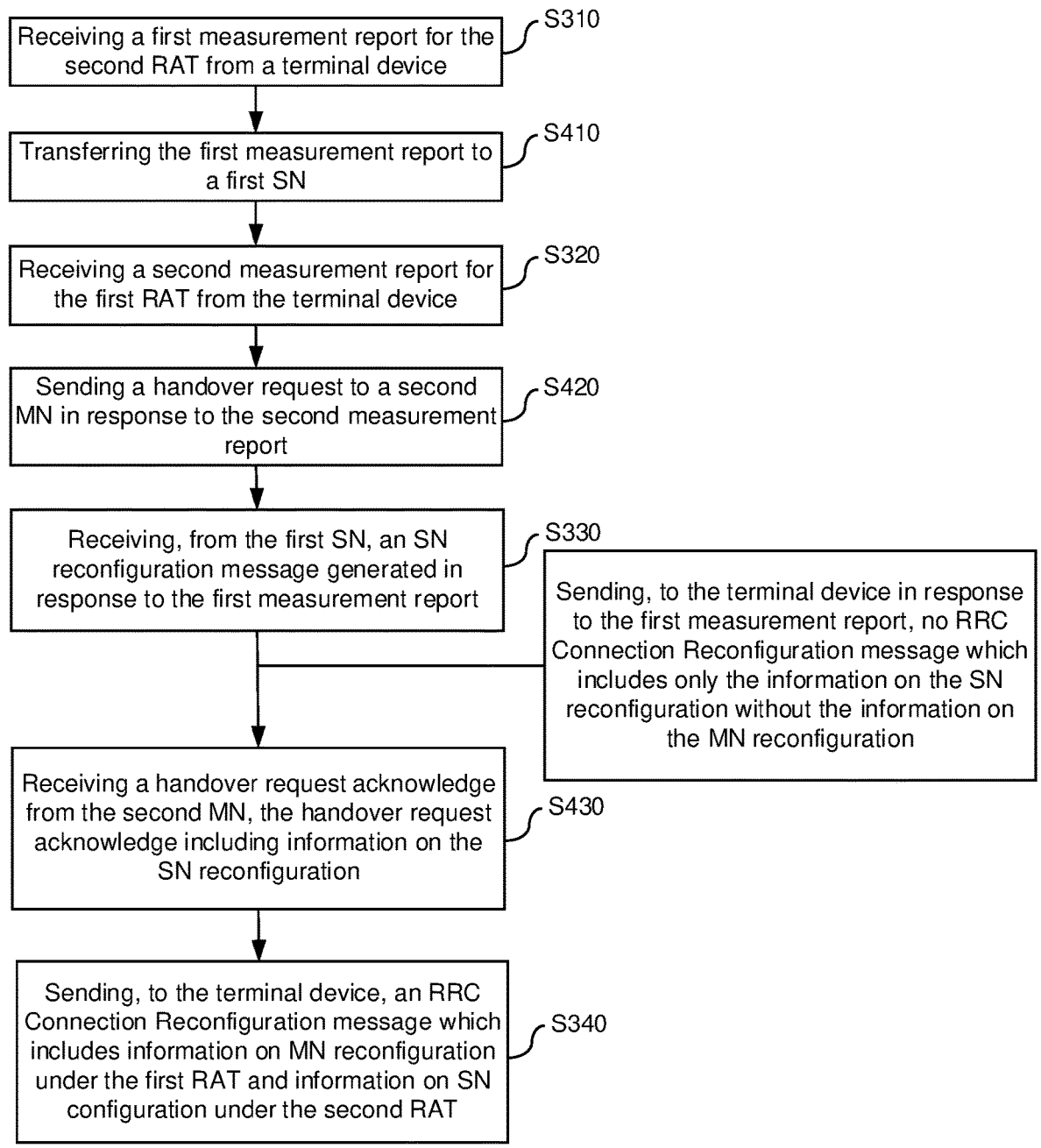
FIG. 4 is a flowchart showing an example of a method for connection reconfiguration for inter-master-node handover at the first master node in the dual connectivity system according to an embodiment of the present disclosure.

FIG. 4 is a flowchart showing an example of a method for connection reconfiguration for inter-MN handover at the first MN in the dual connectivity system according to an embodiment of the present disclosure. The process shown in FIG. 4 may function as an example of the process shown in FIG. 3. Description of the same features which have already been discussed in the above will be omitted.

As shown in FIG. 4, the first MN receives a first measurement report for the second RAT from the terminal device (block S310), and then transfers the first measurement report to the first SN (block S410). In the example shown in FIG. 4, the neighbor secondary cell (e.g. the best neighbor secondary cell), for which the measurement of the service quality is included in the first measurement report, may still be supported by the first SN which is the case of intra-SN handover or may be supported by a second SN which is the case of inter-SN handover. The intra-SN or inter-SN handover may be triggered by the first measurement report, and the SN reconfiguration includes reconfiguration for SN handover within the first SN for the case of intra-SN handover or reconfiguration for SN handover from the first SN to the second SN for the case of inter-SN handover.

The first MN receives a second measurement report for the first RAT from the terminal device (block S320). In the example shown in FIG. 4, the neighbor master cell (e.g. the best neighbor master cell), for which the measurement of the service quality is included in the second measurement report, may be supported by a second MN. In this case, an inter-MN handover may be triggered by the second measurement report, and the MN reconfiguration in this example may include reconfiguration for MN handover from the first MN to the second MN. Therefore, in response to receiving the second measurement report, the first MN sends a handover request to the second MN (block S420). The handover request includes request for handover from the first MN to the second MN. In some examples, the handover request may include information on the measurement of the second RAT of the second measurement report. More specifically, the handover request may include the information (e.g. cell identity) on the current serving secondary cell and the best neighbor secondary cell included in the measurement under the second RAT of the second measurement report.

The first MN receives an SN reconfiguration message from the first SN (block S330). The SN reconfiguration message has been generated by the first SN in response to the first measurement report. The SN reconfiguration message may include at least information (e.g. cell identity) on a candidate new serving secondary cell (which may be the neighbor secondary cell included in the second measurement report). The order between the block S420 and the block S330 may be reversed.

According to a related art, the first MN would have sent, in response to receiving the SN reconfiguration message, an SN reconfiguration request (e.g. an SgNB Addition Request message or an SgNB Modification Request message) to the first SN to proceed with the SN reconfiguration. Upon receiving an SN reconfiguration request acknowledge (e.g. an SgNB Addition Request Acknowledge or an SgNB Modification Request Acknowledge) from the first SN, the first MN would have sent an RRC Connection Reconfiguration message which includes only the information on the SN reconfiguration without the information on the MN reconfiguration. In other words, according to the related art, the first MN would have proceeded with the mobility under the second RAT in response to receiving the SN reconfiguration message.

Different from the related art, according to the method shown in FIG. 4, even after receiving the SN reconfiguration message from the first SN, the first MN sends neither SN reconfiguration request in response to the SN reconfiguration message, nor RRC Connection Reconfiguration message which includes only the information on the SN reconfiguration under the second RAT without the information on the MN reconfiguration under the first RAT. In other words, if receiving the first measurement report and the second measurement report within a short period of time, then the first MN will not proceed with the SN reconfiguration in response to the SN reconfiguration message. This is because the first MN has known that MN handover and reconfiguration will also be necessary. Thus the first MN will wait and then combine the MN reconfiguration with the SN reconfiguration. In addition, in a case where the second measurement report includes not only the measurement under the first RAT but also the measurement under the second RAT, a new serving secondary cell is effected only once from both of the measurements under the second RAT included in the first and second measurement reports.

In this way, after the first MN receives a handover request acknowledge from the second MN (block S430), the first MN will only send one single RRC Connection Reconfiguration message which includes both the information on the MN reconfiguration under the first RAT and the information on the SN reconfiguration under the second RAT (block S340). In some example, if the second measurement report includes not only the measurement under the first RAT but also the measurement under the second RAT, the handover request acknowledge sent from the second MN includes information on the SN reconfiguration. The information on the SN reconfiguration includes information on the new serving secondary cell of the first SN which is determined by the first SN (in the case of intra-SN handover), or information on the new serving secondary cell of the second SN which is determined by the second SN (in the case of inter-SN handover).

According to the example shown in FIG. 4, the RRC Connection Reconfiguration messages which should otherwise have been sent twice respectively for the SN handover and the MN handover can be reduced to only one RRC Connection Reconfiguration message which includes both the information on the SN reconfiguration and the information on the MN reconfiguration. The resource allocated to signaling messages may thus be reduced, and the throughput of the communication system may be increased.

Although the example of FIG. 4 is shown with the inter-MN handover, the method shown in FIG. 4 can also be applied to intra-MN handover in a similar way. If the neighbor master cell (e.g. the best neighbor master cell), for which the measurement of the service quality is included in the second measurement report, is still supported by the first MN, the MN handover is an intra-MN handover and the first MN and the second MN are the same network device. In this case, the inter-MN signaling between the first MN and the second MN may be modified to become intra-MN signaling within the first MN itself. More specifically, the block S420 may be modified to sending a handover request to the first MN itself in response to the second measurement report, and the block S430 may be modified to receiving a handover request acknowledge from the first MN itself.

Figure 5:
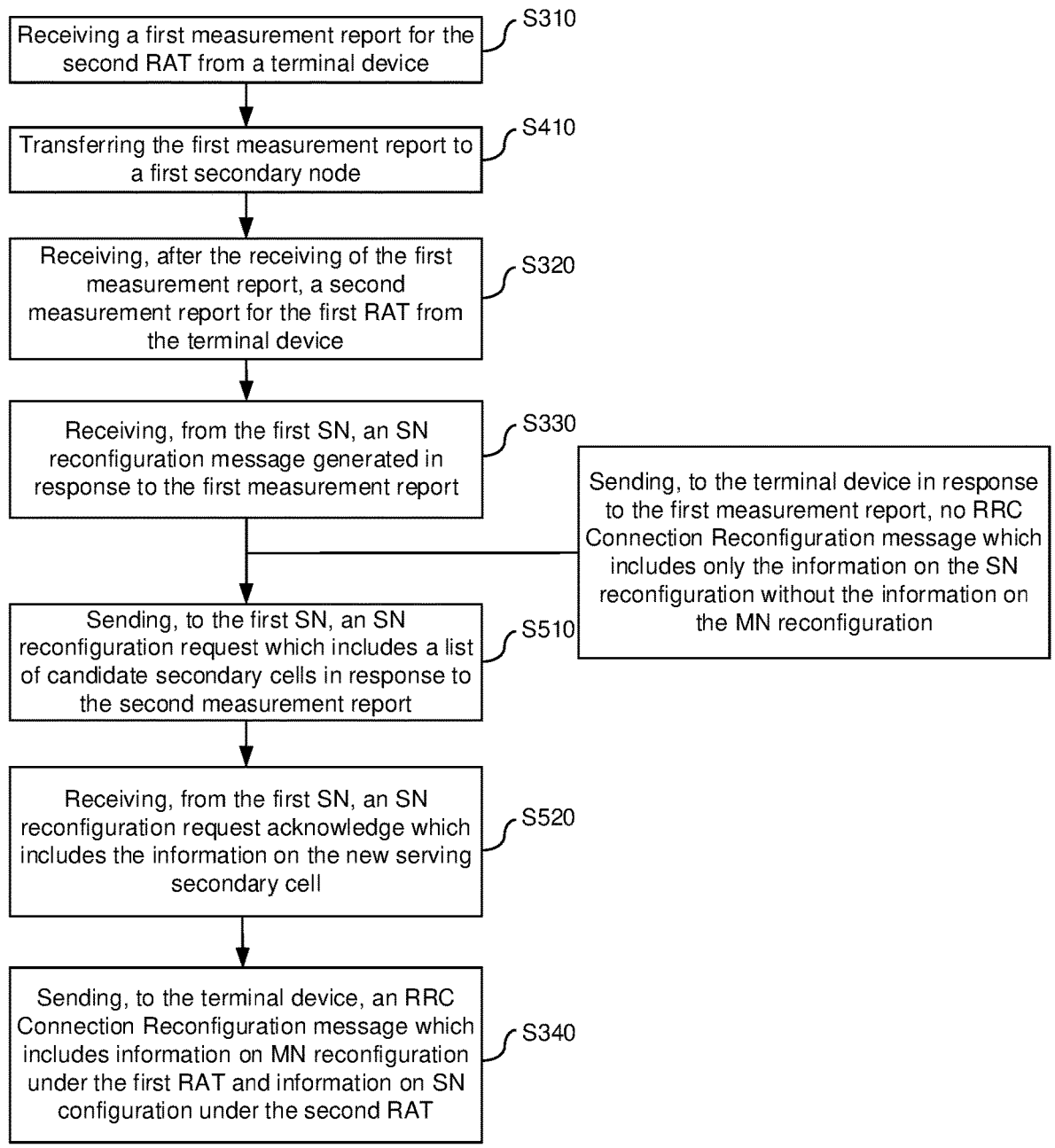
FIG. 5 is a flowchart showing an example of a method for connection reconfiguration for intra-master-node handover at the first master node in the dual connectivity system according to an embodiment of the present disclosure.

In some examples, in the case of intra-MN handover (i.e., the second MN and the first MN are the same network device), intra-MN signaling within the first MN itself may be omitted. FIG. 5 is a flowchart showing an example of a method for connection reconfiguration for intra-master-node handover at the first master node in the dual connectivity system according to an embodiment of the present disclosure. In this case, the MN reconfiguration includes reconfiguration for MN handover within the first MN. The process shown in FIG. 5 may function as an example of the process shown in FIG. 3. Description of the same features which have already been discussed in the above will be omitted.

The operations at blocks S310, S410, S320, S330 and S340 in the example shown in FIG. 5 may be the same as or similar to those in the example shown in FIG. 4. Since the operations at blocks S420 and S430 are a handover request and a handover request acknowledge between the first MN and the second MN, blocks S420 and S430 may be omitted provided that intra-MN signaling within the first MN itself is not necessary.

On the other hand, operations which should have been performed by the second MN are now performed by the first MN because the first MN and the second MN are the same network device in the example shown in FIG. 5.

In the example shown in FIG. 5, the SN reconfiguration includes intra-SN reconfiguration for intra-SN handover within the first SN, and the information on the SN reconfiguration includes information on a new serving secondary cell of the first SN which is determined by the first SN. In this case, the method of the example shown in FIG. 5 further includes block S510 of sending an SN reconfiguration request to the first SN in response to the second measurement report. The SN reconfiguration request is used for requesting the first SN to create or modify link resource of the first SN for working as a secondary node of the first MN. In some examples, if the second measurement report includes both a measurement under the first RAT and a measurement under the second RAT, the SN reconfiguration request may include a list of candidate secondary cells determined by the first MN. The list of candidate secondary cells may include the current serving secondary cell and the best neighbor secondary cell included in the measurement under the second RAT in the second measurement. The method of the example shown in FIG. 5 further includes block S520 of receiving an SN reconfiguration request acknowledge from the first SN. The SN reconfiguration request acknowledge is sent in response to the SN reconfiguration request, and includes the information on the new serving secondary cell determined by the first SN. For example, the SN reconfiguration request may be an SgNB Addition Request message or an SgNB Modification Request message, and the SN reconfiguration request acknowledge may be an SgNB Addition Request ACK message or an SgNB Modification Request message ACK.

Although FIG. 5 shows the case of intra-MN handover with intra-SN handover, the method of the example shown in FIG. 5 may also be applied to the case of intra-MN handover with inter-SN handover. In the case of intra MN handover with inter-SN handover, the SN reconfiguration includes reconfiguration for SN handover from the first SN to a second SN, and the information on the SN reconfiguration includes information on a new serving secondary cell of the second SN which is determined by the second SN. In this case, block S510 may be modified to sending an SN reconfiguration request to the second SN in response to the second measurement report. If the second measurement report includes both a measurement under the first RAT and a measurement under the second RAT, the SN reconfiguration request may include a list of candidate secondary cells determined by the first MN. Block S520 may also be modified to receiving a SN reconfiguration request acknowledge from the second SN. The SN reconfiguration request includes the information on the new serving secondary cell determined by the second SN. For example, the SN reconfiguration request may be an SgNB Addition Request message, and the SN reconfiguration request acknowledge may be an SgNB Addition Request Acknowledge message.

Figure 6:
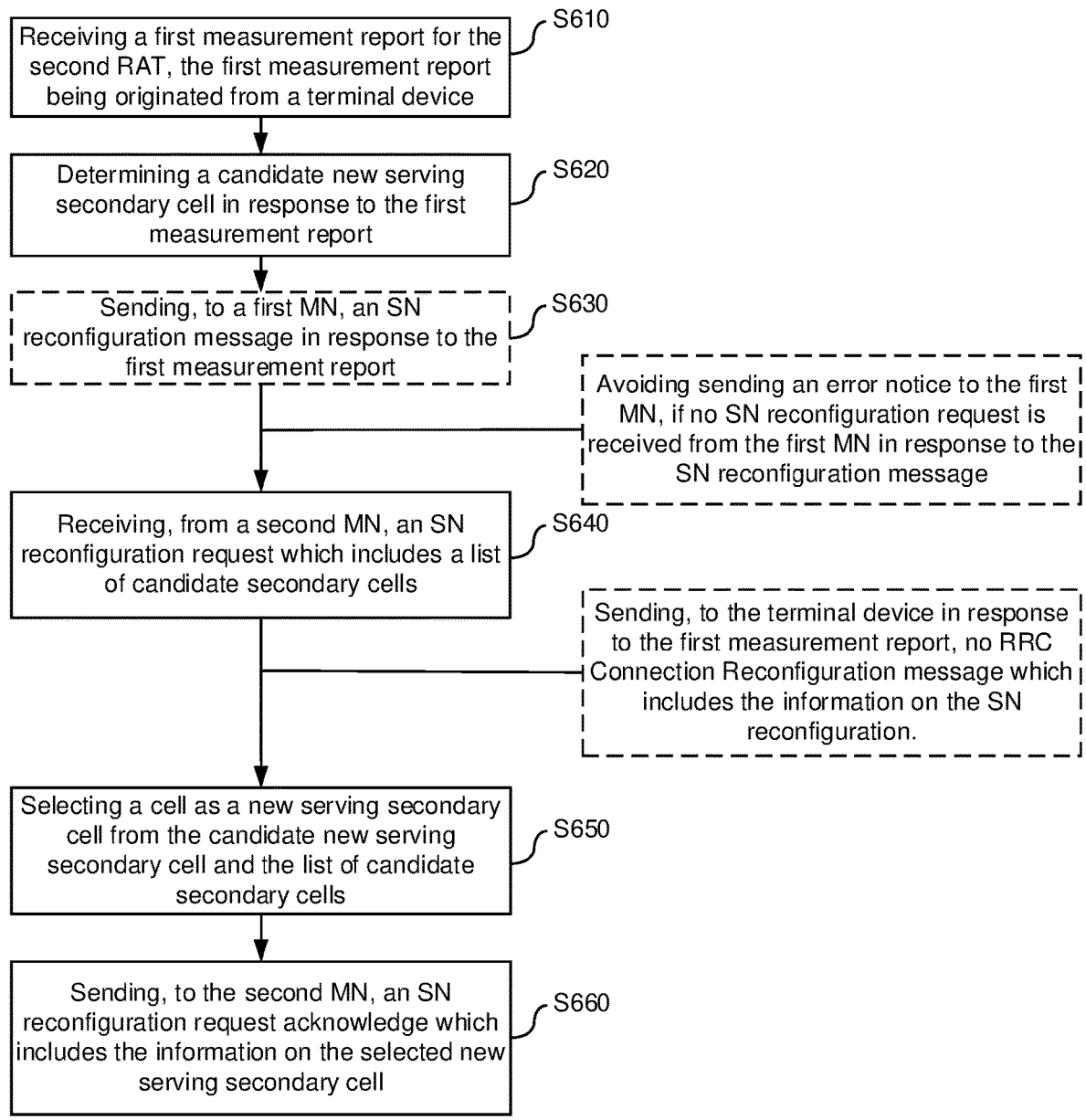
FIG. 6 is a flowchart showing an example of a method for connection reconfiguration at a first secondary node in the dual connectivity system according to an embodiment of the present disclosure.

Now description will be made with respect to the operations performed at the first SN. FIG. 6 is a flowchart showing an example of a method for connection reconfiguration at the first SN in the dual connectivity system according to an embodiment of the present disclosure. Description of the same features which have already been discussed in the above will be omitted.

As shown in FIG. 6, the method performed at the first SN may include a block S610 of receiving a first measurement report for the second RAT. The first measurement report may be originated from a terminal device. In an example, the first measurement report may be received directly from the terminal device in a case where there is available Signaling Radio Bearer (e.g. SRB3) for the dual connectivity. In an example, the first measurement report may be received from the terminal device via the first MN in a case where there is no available Signaling Radio Bearer for the dual connectivity.

The method further includes block S620 of determining a candidate new serving secondary cell in response to the first measurement report. The candidate new serving secondary cell may be determined to be the best neighbor secondary cell included in the first measurement report.

The method further includes block S640 of receiving an SN reconfiguration request from a second MN. In an example, if the second measurement report includes both the measurement under the first RAT and the measurement under the second RAT, the SN reconfiguration request may include a list of candidate secondary cells. Receiving the SN reconfiguration request from the second MN indicates that there will be MN handover and the second MN is a target MN in the MN handover. In other words, the second MN invites the first SN to select a new serving secondary cell from the list of candidate secondary cells. It is possible that the candidate new serving secondary cell determined in S620 is the same as a secondary cell of the list of candidate secondary cells. It is also possible that the candidate new serving secondary cell determined in S620 is different from any secondary cell of the list of candidate secondary cells.

The method further includes block S650 of selecting a cell as a new serving secondary cell from the candidate new serving secondary cell and the list of candidate secondary cells. The first SN may select a cell having the best service quality as the new serving secondary cell. In an example, the method may further include block S660 of sending an SN reconfiguration request acknowledge to the second MN. The SN reconfiguration request acknowledge includes the information on the new serving secondary cell selected at block S650.

In the related art, the first SN will determine a new serving secondary cell in response to the first measurement report which includes measurement under the second RAT, and related reconfiguration from the current serving secondary cell to the new serving secondary cell will be actually implemented. Then upon receiving an SN reconfiguration request from the second MN, the first SN will determine a further new serving secondary cell from the list of candidate secondary cells, and then related reconfiguration from the new serving secondary cell to the further new serving secondary cell will be implemented. The frequent reconfiguration operations in a short time may be unnecessary and will cause increased burden on the terminal device and increased resource allocated to related signaling messages.

According to the example shown in FIG. 6, the new serving secondary cell determined in response to the first measurement report is only considered as candidate, and a final new serving secondary cell is selected from both the candidate new serving secondary cell and the list of candidate secondary cells. In other words, instead of performing an SN reconfiguration for the first time and then performing another SN reconfiguration for the second time along with an MN reconfiguration, the SN reconfiguration is actually performed only once. In this way, frequent handover operations may be avoided, the burden on the terminal device may be alleviated, and the efficiency of the communication system may be increased.

In an example, there is no available Signaling Radio Bearer for the dual connectivity and therefore the first SN communicates with the terminal device via a first MN. In this case, the method shown in FIG. 6 may further include block S630 of sending an SN reconfiguration message to the first MN in response to the first measurement report. Block S630 may be performed after block S620 and before S640. The SN reconfiguration message indicates that SN handover (inter-SN handover or intra-SN handover) is required, and includes at least information (e.g. cell identity) on the candidate new serving secondary cell determined at block S620.

According to the related art, upon receiving the SN reconfiguration message from the first SN, the first MN will send an SN reconfiguration request (e.g. an SgNB Addition Request message or an SgNB Modification Request message) to the first SN to proceed with the SN reconfiguration. In some examples, if the second measurement report includes both the measurement under the first RAT and the measurement under the second RAT, the MN handover and reconfiguration will be performed together with another SN handover and reconfiguration in response to the second measurement report. If the first SN fails to receive the SN reconfiguration request, it will send an error notice to the first MN.

According to examples of the present disclosure, different from the related art, the first MN will not send the SN reconfiguration request in response to the SN reconfiguration message because it has known that MN handover and reconfiguration will also be necessary. In some examples, if the second measurement report includes both the measurement under the first RAT and the measurement under the second RAT, the SN handover in response to the first measurement report will be combined with the SN handover in response to the second measurement report. Therefore, according to the examples of the present disclosure, the first SN avoids sending an error notice to the first MN, even if no SN reconfiguration request is received from the first MN.

In an example, there is available Signaling Radio Bearer for the dual connectivity and therefore the first SN can communicate directly with the terminal device. In this case, the first SN should have sent an RRC Connection Reconfiguration message to the terminal device in response to the first measurement report in the related art. Different from the related art, according to the example of the present disclosure, the first SN sends, to the terminal device in response to the first measurement report, no RRC Connection Reconfiguration message which includes the information on the SN reconfiguration.

Although FIG. 6 shows the case of inter-MN handover, the method of the example shown in FIG. 6 may also be applied to the case of intra-MN handover. In the case of intra-MN handover, the first MN and the second MN are the same network device. In this case, block S640 may be modified to receiving the SN reconfiguration request from the first MN. In addition, block S660 may be modified to sending the SN reconfiguration request acknowledge to the first MN.

Figure 7:
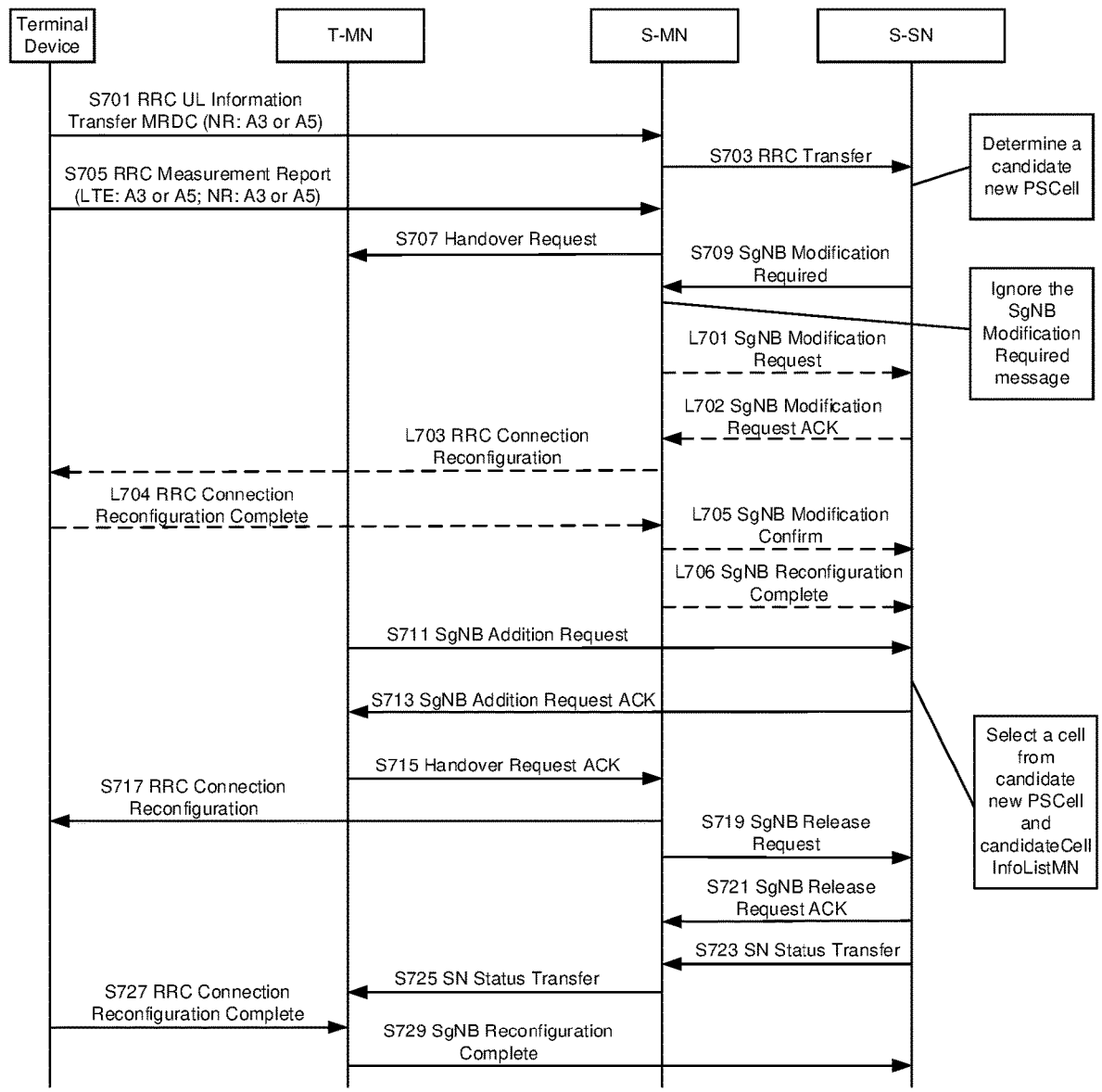
FIG. 7 is a flowchart showing an example of a method for connection reconfiguration for inter-master-node handover with intra-secondary-node handover without Signaling Radio Bearer for dual connectivity in a communication system according to an embodiment of the present disclosure.

Some exemplary examples according to the present disclosure will now be described with reference to FIGS. 7-10. FIG. 7 may function as an example of FIGS. 3, 4 and 6, FIG. 8 may function as an example of FIGS. 3, 4 and 6, FIG. 9 may function as an example of FIGS. 3, 5 and 6, and FIG. 10 may function as an example of FIG. 6. Description of the same features which have already been discussed with reference to FIGS. 1-6 in the above will be omitted.

In the examples shown in FIGS. 7-10, the first RAT is LTE, and the second RAT is NR. The S-MN is a source MN which is the MN before MN handover/reconfiguration and corresponds to the first MN. The T-MN is a target MN which is the MN after MN handover/reconfiguration and corresponds to the second MN. The S-SN is a source SN which is the SN before SN handover/reconfiguration and corresponds to the first SN. The T-SN is a target SN which is the SN after SN handover/reconfiguration and corresponds to the second SN.

FIG. 7 is a flowchart showing an example of a method for connection reconfiguration for inter-MN handover with intra-SN handover without Signaling Radio Bearer (e.g. SRB3) for dual connectivity in a communication system according to an embodiment of the present disclosure.

At step S701, the S-MN receives an RRC UL information Transfer MRDC which includes an RRC Measurement Report (first measurement report). The first measurement report may include an NR measResult. The first measurement report includes NR measurement with Event A3 or Event A5. The step S701 may be an example of block S310.

At step S703, the S-MN sends an RRC Transfer message, transparently transferring the first measurement report to the S-SN. The step S703 may be an example of block S410 and block S610.

In response to receiving the first measurement report, the S-SN determines that the best neighbor secondary cell included in the NR measurement of the first measurement report is supported by the same S-SN, and therefore intends to trigger an intra-SN primary secondary cell (PSCell, serving secondary cell) change. In other words, the S-SN determines a candidate new PSCell which is supported by the same S-SN in response to the first measurement report. The candidate new PSCell may be the best neighbor secondary cell included in the NR measurement of the first measurement report. This step may be an example of block S620.

Before the S-SN is able to send an SgNB Modification Required message to the S-MN in response to the intra-gNB PSCell change, at step S705, the S-MN receives an RRC Measurement Report (second measurement report) from the terminal device. The second measurement report includes a EUTRAN measResult. The second measurement report includes LTE measurement with Event A3 or Event A5. In addition, the second measurement report further includes another NR measResult which is an NR measurement (measurement for the second RAT included in the second measurement report) with Event A3 or Event A5. The step S705 may be an example of block S320. The second measurement report includes the other NR measResult if an NR measconfig is configured and the eventID is set to eventA3 or eventA4 or eventA5.

The S-MN does not block or buffer the second measurement report even though it receives the second measurement report just shortly after the first measurement report. In response to receiving the second measurement report, the S-MN determines that the best neighbor master cell included in the LTE measurement report of the second measurement report is supported by another MN, namely the T-MN. Therefore, at step S707, the S-MN sends a Handover Request to the T-MN in response to the second measurement report, requesting the T-MN to perform preparation work for the handover from the S-MN to the T-MN. The Handover Request includes the information on the NR measurement included in the second measurement report. More specifically, the Handover Request includes the information on the current PSCell and a best neighbor secondary cell included in the NR measurement of the second measurement report. The step S707 may be an example of block S420.

At step S709, the S-MN receives an SgNB Modification Required message sent from the S-SN indicating that modification of link resource between the S-MN and the S-SN is required. In other words, the SgNB Modification Required message indicates that the PSCell should be changed. The SgNB Modification Required message comes with a Radio Network Layer Cause of "Handover Desirable for Radio Reasons during MN HO". The SgNB Modification Required message is sent from the S-SN in response to the determination of the candidate new PSCell, and includes information on the candidate new PSCell. The information on the candidate new PSCell may be included in an SgNB to MeNB container in the SgNB Modification Required message. The step S709 may be an example of block S330 and block S630. The order between the step S707 and the step S709 may be reversed.

According to a related art, there would have been steps L701-L706 for NR mobility performed in response to the first measurement report involved in the method. At step L701, the S-MN sends an SgNB Modification Request to the S-SN in response to the SgNB Modification Required message, to request reconfiguration of the S-SN including changing the current PSCell to the candidate new PSCell. At step L702, the S-SN sends an SgNB Modification Request ACK to the S-MN to acknowledge the reconfiguration. At step L703, the S-MN sends an RRC Connection Reconfiguration to the terminal device. The RRC Connection Reconfiguration includes mobility control information for NR including the information (e.g. cell identity) on the candidate new PSCell. At step L704, the S-MN receives an RRC Connection Reconfiguration Complete from the terminal device. At step L705, the S-MN sends an SgNB Modification Confirm to the S-SN. At step L706, the S-MN sends an SgNB Reconfiguration Complete to the S-SN and completes the SN reconfiguration. In other words, according to the related art, the S-MN will proceed with the NR mobility to change to the candidate new PSCell in response to receiving the SgNB Modification Required message from the S-SN.

Different from the related art, the method of the example shown in FIG. 7 does not include the steps L701-L706. Instead, even receiving the SgNB Modification Required message sent from the S-SN, the S-MN ignores the SgNB Modification Required message and does not actually proceed with the SN reconfiguration in response to the first measurement report. In other words, if the S-MN receives a first measurement report with NR measurement and then receives a second measurement report with LTE measurement within a short period of time, the S-MN will suspend the SN reconfiguration. The short period of time may be equal to the time from the timing when the S-MN receives the first measurement report with NR measurement to the timing when the S-MN receives the SgNB Modification Required message. The S-SN also avoids sending an error notice to the S-MN even if no SgNB Modification Request or no SgNB Modification Confirm is received from the S-MN in response to the SgNB Modification Required message.

From the information on the NR measurement contained in the Handover Request sent from the S-MN, the T-MN determines that the best neighbor secondary cell is supported by the S-SN. Therefore, the T-MN decides that the S-SN should still function as its secondary node. Thus at step S711, the T-MN sends an SgNB Addition Request (SN reconfiguration request) to the S-SN in response to receiving the Handover Request. The SgNB Addition Request is used for requesting the S-SN to create link resource for working as a secondary node of the T-MN. The SgNB Addition Request comes with a cause of "Inter-eNB HO/intra-eNB HO". The SgNB Addition Request includes a candidateCellInforListMN (the list of candidate secondary cells) determined by the T-MN according to the NR measurement included in the second measurement report. The candidateCellInforListMN may be included in CGConfigInfo. The candidateCellInforListMN may include the current PSCell (current serving secondary cell) and the best neighbor secondary cell included in the NR measurement of the second measurement report. The step S711 may be an example of block S640.

In response to receiving the SgNB Addition Request, the S-SN triggers a PSCell change. More specifically, the PSCell change includes selecting a new PSCell as the new serving secondary cell from the candidate new PSCell determined previously by the S-SN as well as the secondary cells in the candidateCellInforListMN sent from the T-MN. In an example, the S-SN includes the new PSCell in an NR RRC configuration message in an X2AP message to be sent. This step may be an example of block S650. Then in S713, the S-SN sends an SgNB Addition Request ACK (SN reconfiguration request acknowledge) to the T-MN. The SgNB Addition Request ACK includes the new PSCell selected from the candidate new PSCell and the candidateCellInforListMN by the S-SN. The step S713 may be an example of block S660.

Then at step S715, the T-MN sends a Handover Request ACK (handover request acknowledge) to the S-MN indicating that the preparation work for the handover at the T-MN side has been completed. The Handover Request ACK sent from the T-MN may include the new PSCell selected from the candidate new PSCell and the candidateCellInforListMN by the S-SN as the information on the SN reconfiguration. The step S715 may be an example of block S430.

At step S717, the S-MN sends an RRC Connection Reconfiguration message to the terminal device to instruct the terminal device to perform handover. As described in the above, the RRC Connection Reconfiguration message sent to the terminal device includes both information on MN reconfiguration under the first RAT (LTE) and information on SN reconfiguration under the second RAT (NR). More specifically, the information on MN reconfiguration under LTE included in the RRC Connection Reconfiguration message may at least include mobilityControlInfo (mobility control information) under LTE, which may include a cell identity of the new serving master cell supported by the T-MN. Similarly, the information on SN reconfiguration under NR included in the same RRC Connection Reconfiguration message may at least include nr-SecondaryCellGroupConfig and/or nr-RadioBearerConfig2 which may include a cell identity of the new PSCell supported by the S-SN. The step S717 may be an example of block S340.

If the SN reconfiguration request sent at step S711 is an SgNB Addition Request, then at step S719, the S-MN sends an SgNB Release Request to the S-SN to request release of the link resource of the S-SN for working as a secondary node of the S-MN. At step S721, the S-SN sends an SgNB Release Request ACK to the S-MN indicating that the release of the link resource has been completed.

At step S723, the S-SN sends an SN (Sequence Number) Status Transfer message to the S-MN. Further, at step S725, the S-MN sends an SN Status Transfer message to the T-MN.

At step S727, the T-MN receives an RRC Connection Reconfiguration Complete message from the terminal device. The RRC Connection Reconfiguration Complete message indicates that the terminal device has completed the handover. At step S729, the T-MN sends the SgNB Reconfiguration Complete to the S-SN to complete the SN reconfiguration.

After step S729, there may be other operations such as the T-MN sending an S1 Path Switch Request to a Mobility Management Entity (MME), the MME sending an S1 Path Switch Request ACK to the T-MN, the T-MN sending a UE Context Release to the S-MN, and the S-MN sending a UE Context Release to the S-SN.

Figure 8:
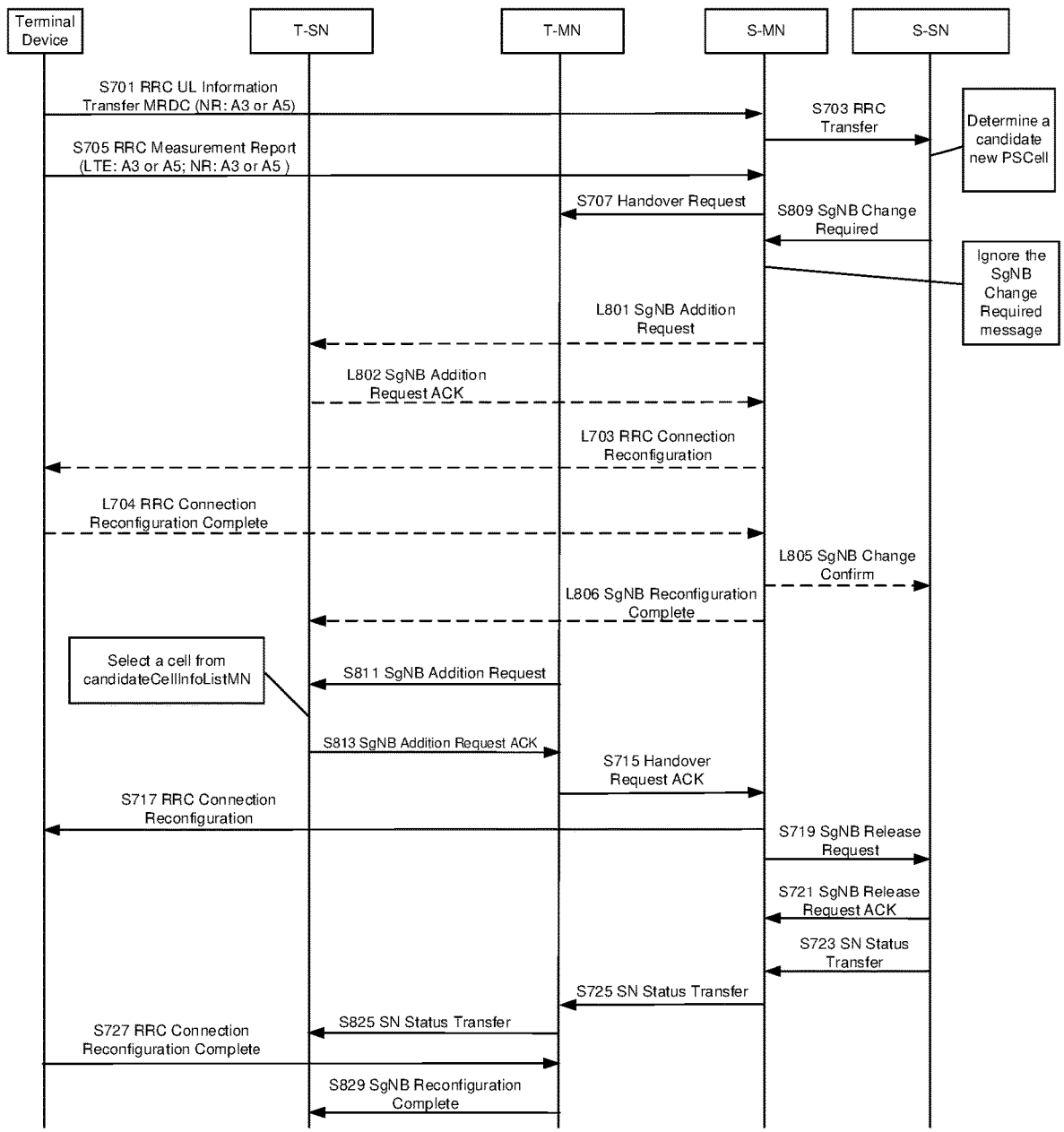
FIG. 8 is a flowchart showing an example of a method for connection reconfiguration for inter-master-node handover with inter-secondary-node handover without Signaling Radio Bearer for dual connectivity in a communication system according to an embodiment of the present disclosure.

FIG. 8 is a flowchart showing an example of a method for connection reconfiguration for inter-MN handover with inter-SN handover without Signaling Radio Bearer for dual connectivity in a communication system according to an embodiment of the present disclosure. FIG. 8 is different from FIG. 7 in that the SN handover is inter-SN handover from the S-SN to a T-SN. Description of the same features which have already been discussed with reference to FIGS. 1-7 in the above will be omitted.

Different from the example shown in FIG. 7, in response to receiving the RRC Transfer which includes the first measurement report at step S703, the S-SN determines that the best neighbor secondary cell included in the NR measurement of the first measurement report is supported by the T-SN. Therefore, the S-SN intends to trigger an inter-SN primary secondary cell (PSCell, serving secondary cell) change. In other words, the S-SN determines a candidate new PSCell which is supported by the T-SN in response to the first measurement report. The candidate new PSCell may be the best neighbor secondary cell included in the NR measurement of the first measurement report.

At step S809, the S-MN receives an SgNB Change Required message sent from the S-SN indicating that change of the secondary node from the S-SN to the T-SN is required. In other words, the SgNB Change Required message indicates that the PSCell should be changed to another PSCell supported by the T-SN. The SgNB Change Required message comes with a Radio Network Layer Cause of "Handover Desirable for Radio Reasons during MN HO". The SgNB Change Required message is sent from the S-SN in response to the determination of the candidate new PSCell, and includes information on the candidate new PSCell supported by the T-SN. The information on the candidate new PSCell may be included in an SgNB to MeNB container in the SgNB Change Required message. The step S809 may be an example of block S330. The order between step S707 and step S809 may be reversed.

According to a related art, there would have been steps L801-L802, L703-L704 and L805-L806 for NR mobility performed in response to the first measurement report involved in the method. At step L801, the S-MN sends an SgNB Addition Request to the T-SN in response to the SgNB Change Required message, to request reconfiguration including changing the PSCell to the candidate new PSCell of the T-SN. At step L802, the T-SN sends an SgNB Addition Request ACK to the S-MN to acknowledge the reconfiguration. At step L703, the S-MN sends an RRC Connection Reconfiguration to the terminal device. The RRC Connection Reconfiguration includes mobility control information for NR including the information (e.g. cell identity) on the candidate new PSCell. At step L704, the S-MN receives an RRC Connection Reconfiguration Complete from the terminal device. At step L805, the S-MN sends an SgNB Change Confirm to the S-SN. At step L806, the S-MN sends an SgNB Reconfiguration Complete to the T-SN and completes the SN reconfiguration. In other words, according to the related art, the S-MN will proceed with the NR mobility to connect to the T-SN which supports the candidate new PSCell, in response to receiving the SgNB Change Required message from the S-SN.

Different from the related art, the method of the example shown in FIG. 8 does not include the steps L801-L802, L703-L704 and L805-L806. Instead, even receiving the SgNB Change Required message sent from the S-SN, the S-MN ignores the SgNB Change Required message and does not actually proceed with the SN reconfiguration in response to the first measurement report. In other words, if the S-MN receives a first measurement report with NR measurement and then receives a second measurement report with LTE measurement within a short period of time, the S-MN will suspend the SN reconfiguration. The short period of time may be equal to the time from the timing when the S-MN receives the first measurement report with NR measurement to the timing when the S-MN receives the SgNB Change Required message. The S-SN also avoids sending an error notice to the S-MN even if no SgNB Change Confirm is received from the S-MN in response to the SgNB Change Required message.

From the information on the NR measurement contained in the Handover Request sent from the S-MN, the T-MN determines that the best neighbor secondary cell is supported by the T-SN. Therefore, the T-MN decides that its secondary node should change from the S-SN to the T-SN. Thus at step S811, the T-MN sends an SgNB Addition Request (SN reconfiguration request) to the T-SN in response to receiving the Handover Request. The SgNB Addition Request is used for requesting the T-SN to create link resource of the T-SN for working as a secondary node of the T-MN. The SgNB Addition Request comes with a cause of "Inter-eNB HO/intra-eNB HO". The SgNB Addition Request includes a candidateCellInforListMN (the list of candidate secondary cells) determined by the T-MN according to the NR measurement included in the second measurement report. The candidateCellInforListMN may be included in CGConfig-Info. The candidateCellInforListMN may include the current PSCell (current serving secondary cell) and the best neighbor secondary cell included in the NR measurement of the second measurement report.

In response to receiving the SgNB Addition Request, the T-SN triggers a PSCell change. More specifically, the PSCell change includes selecting a new PSCell as the new serving secondary cell from the secondary cells in the candidateCellInforListMN sent from the T-MN. In an example, the T-SN includes the new PSCell in an NR RRC configuration message in an X2AP message to be sent. Then in S813, the T-SN sends an SgNB Addition Request ACK (SN reconfiguration request acknowledge) to the T-MN. The SgNB Addition Request ACK includes the new PSCell selected from the candidateCellInforListMN by the T-SN.

Steps S715, S717, S719, S721, S723, S725 and S727 in FIG. 8 may be performed in the same way as for those shown in FIG. 7. In particular, at step S717, the S-MN sends an RRC Connection Reconfiguration message to the terminal device to instruct the terminal device to perform handover. As described in the above, the RRC Connection Reconfiguration message sent to the terminal device includes both information on MN reconfiguration under the first RAT (LTE) and information on SN reconfiguration under the second RAT (NR). More specifically, the information on MN reconfiguration under LTE included in the RRC Connection Reconfiguration message may at least include mobilityControlInfo (mobility control information) under LTE, which may include a cell identity of the new serving master cell supported by the T-MN. Similarly, the information on SN reconfiguration under NR included in the same RRC Connection Reconfiguration message may at least include nr-SecondaryCellGroupConfig and/or nr-RadioBearerConfig2 which may include a cell identity of the new PSCell supported by the T-SN. The step S717 may be an example of block S340.

At step S825, the T-MN sends an SN Status Transfer message to the T-SN. At step S727, the T-MN receives an RRC Connection Reconfiguration Complete message from the terminal device. The RRC Connection Reconfiguration Complete message indicates that the terminal device has completed the handover. At step S829, the T-MN sends an SgNB Reconfiguration Complete to the T-SN to complete the SN reconfiguration. Other steps shown in FIG. 8 which have not been described may be the same as those shown in FIG. 7.

Although the examples of FIGS. 7-8 are shown with the inter-MN handover, the methods shown in FIGS. 7-8 can also be applied to intra-MN handover in a similar way. If the neighbor master cell (e.g. the best neighbor master cell), for which the measurement of the service quality is included in the LTE measurement of the second measurement report, is still supported by the S-MN, the MN handover is an intra-MN handover so that the S-MN and the T-MN are the same network device. In this case, the inter-MN signaling between the S-MN and the T-MN may be modified to become intra-MN signaling within the S-MN itself. More specifically, the step S707 may be modified to sending a Handover Request to the S-MN itself in response to the LTE measurement of the second measurement report, and step S715 may be modified to receiving a Handover Request ACK from the S-MN itself. Other operations involving the T-MN may be modified to instead involve the S-MN. In the case of intra-MN handover with intra-SN handover, the SN reconfiguration request may be an SgNB Addition Request or an SgNB Modification Request, and the SN reconfiguration request acknowledge may be an SgNB Addition Request ACK or an SgNB Modification Request ACK. The SgNB Modification Request may come with a cause of "MCG mobility from eNB".

After step S829, there may be other operations such as the T-MN sending an S1 Path Switch Request to the MME, the MME sending an S1 Path Switch Request ACK to the T-MN, the T-MN sending a UE Context Release to the S-MN, and the S-MN sending a UE Context Release to the S-SN.

Figure 9:
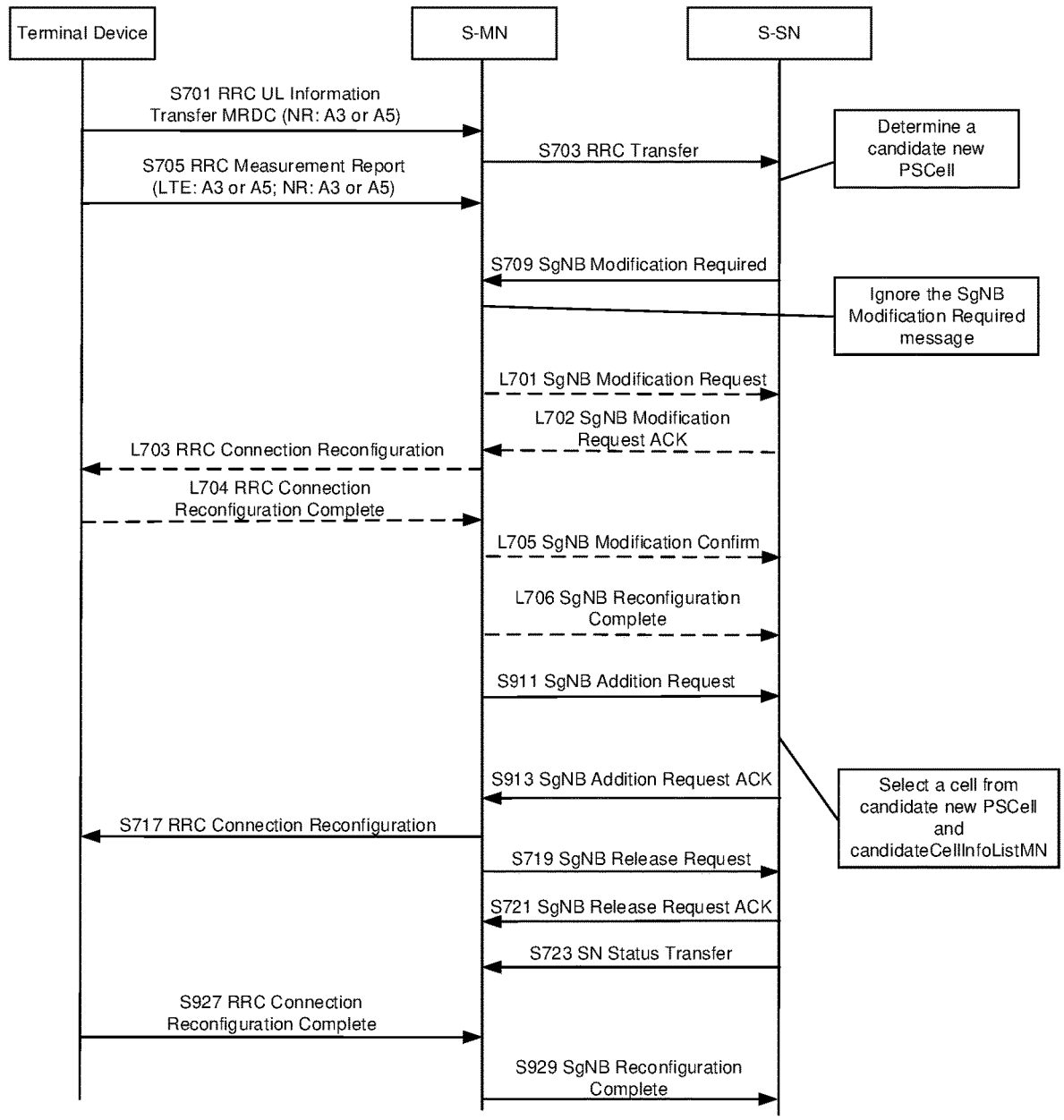
FIG. 9 is a flowchart showing an example of a method for connection reconfiguration for intra-master-node handover with intra-secondary-node handover without Signaling Radio Bearer for dual connectivity in a communication system according to an embodiment of the present disclosure.

In some examples, in the case of intra-MN handover (i.e., the T-MN and the S-MN are the same network device), intra-MN signaling within the S-MN itself may be omitted. FIG. 9 is a flowchart showing an example of a method for connection reconfiguration for intra-MN handover with intra-SN handover without Signaling Radio Bearer (e.g. SRB3) for dual connectivity in a communication system according to an embodiment of the present disclosure. FIG. 9 is different from FIG. 7 in that the MN handover is intra-MN handover within the S-MN. Description of the same features which have already been discussed with reference to FIGS. 1-8 in the above will be omitted.

Different from the example shown in FIG. 7, in response to receiving the second measurement report which includes the LTE measurement at step S705, the S-MN determines that the best neighbor master cell included in the LTE measurement of the second measurement report is supported by the same S-MN. Since the operations at steps S707 and S715 are a handover request and a handover request acknowledge between the S-MN and the T-MN, steps S707 and S715 may be omitted provided that intra-MN signaling within the S-MN itself is not necessary.

On the other hand, operations which should have been performed by the T-MN are performed by the S-MN because the S-MN and the T-MN are the same network device in the example shown in FIG. 9.

From the information on the NR measurement included in the second measurement report, the S-MN determines that the best neighbor secondary cell is supported by the same S-SN. Therefore, the S-MN decides that the S-SN should still remain as its secondary node. Thus at step S911, the S-MN sends an SgNB Addition Request (SN reconfiguration request) to the S-SN in response to receiving the second measurement report. The SgNB Addition Request is used for requesting the S-SN to create link resource of the S-SN for working as a secondary node of the S-MN. The SgNB Addition Request includes a candidateCellInforListMN (the list of candidate secondary cells) determined by the S-MN. The candidateCellInforListMN may be included in CGConfigInfo. The candidateCellInforListMN may include the current PSCell (current serving secondary cell) and the best neighbor secondary cell included in the NR measurement of the second measurement report. Although FIG. 9 shows that the S-MN sends an SgNB Addition Request to the S-SN in response to receiving the second measurement report, the SN reconfiguration request may also be an SgNB Modification Request in the case of intra-MN handover with intra-SN handover. The step S911 may be an example of block S510 and block S640.

In response to receiving the SgNB Addition Request or the SgNB Modification Request, the S-SN selects a new PSCell as the new serving secondary cell from the candidate new PSCell determined previously by the S-SN as well as the secondary cells in the candidateCellInforListMN sent from the S-MN. Then at step S913, the S-SN sends an SgNB Addition Request ACK or an SgNB Modification Request ACK (SN reconfiguration request acknowledge) to the S-MN. The SgNB Addition Request ACK or the SgNB Modification Request ACK includes the new PSCell selected from the candidate new PSCell and the candidateCellInforListMN by the S-SN. The step S913 may be an example of block S520 and block S660.

In addition, at S927, the S-MN receives an RRC Connection Reconfiguration Complete from the terminal device. At S929, the S-MN sends an SgNB Reconfiguration Complete to the S-SN to complete the SN reconfiguration.

Other steps shown in FIG. 9 which have not been described may be the same as those shown in FIG. 7 of FIG. 8. If the SN reconfiguration request sent at step S911 is an SgNB Modification Request, then the steps S719 and S721 may not be included.

Although the example in FIG. 9 is shown with intra-MN handover with intra-SN handover, it can also be modified to an example with intra-MN handover with inter-SN handover with reference to FIG. 8.

More specifically, the example in FIG. 9 can be modified to one with intra-MN handover with inter-SN handover, with the SgNB Addition Request being sent to the T-SN at step S911, the SgNB Addition Request ACK being sent from the T-SN at step S913, a step being added at which an SN Status Transfer is sent from the S-MN to the T-SN, and the SgNB Reconfiguration Complete being sent to the T-SN at step S929.

After step S929, there may be other operations such as the S-MN sending an S1 Path Switch Request to the MME, the MME sending an S1 Path Switch Request ACK to the S-MN, and the S-MN sending a UE Context Release to the S-SN.

FIGS. 7-9 all illustrate examples in which Signaling Radio Bearer (e.g. SRB3) is not available for dual connectivity. Therefore, in FIGS. 7-9, the terminal device communicates with the S-SN via the S-MN. Different from FIGS. 7-9, FIG. 10 shows an example in which the Signaling Radio Bearer (e.g. SRB3) is available for dual connectivity, and therefore the terminal device and the S-SN can communicate with each other directly. Description of the same features which have already been discussed with reference to FIGS. 1-9 in the above will be omitted.

At step S1001, the S-SN receives an RRC Measurement Report (first measurement report). The first measurement report includes NR measurement with Event A3 or Event A5. The step S1001 may be an example of block S610.

In response to receiving the first measurement report, the S-SN determines that the best neighbor secondary cell included in the NR measurement of the first measurement report is supported by the same S-SN, and therefore intends to trigger an intra-SN primary secondary cell (PSCell, serving secondary cell) change. In other words, the S-SN determines a candidate new PSCell which is supported by the same S-SN in response to the first measurement report. The candidate new PSCell may be the best neighbor secondary cell included in the NR measurement of the first measurement report. This step may be an example of block S620.

Before the S-SN is able to send an RRC Connection Reconfiguration message to the terminal device, the steps S705, S707 and S711 are performed. More specifically, at step S705, the S-MN receives an RRC Measurement Report (second measurement report). The second measurement report includes LTE measurement with Event A3 or Event A5. In addition, the second measurement report further includes another NR measurement (measurement for the second RAT included in the second measurement report) with Event A3 or Event A5.

In response to receiving the second measurement report, the S-MN determines that the best neighbor master cell included in the LTE measurement of the second measurement report is supported by another MN, namely the T-MN. Therefore, at step S707, the S-MN sends a Handover Request to the T-MN, requesting the T-MN to perform preparation work for the handover from the S-MN to the T-MN. The Handover Request includes the information on the NR measurement included in the second measurement report. In other words, The Handover Request includes the information on the current PSCell and a best neighbor secondary cell included in the NR measurement of the second measurement report.

From the information on the NR measurement contained in the Handover Request sent from the S-MN, the T-MN determines that the best neighbor secondary cell is supported by the S-SN. Therefore, the T-MN decides that the S-SN should still function as its secondary node. Thus at step S711, the T-MN sends an SgNB Addition Request (SN reconfiguration request) to the S-SN in response to receiving the Handover Request. The SgNB Addition Request is used for requesting the S-SN to create link resource of the S-SN for working as a secondary node of the T-MN. The SgNB Addition Request comes with a cause of "Inter-eNB HO/intra-eNB HO". The SgNB Addition Request includes a candidateCellInforListMN (the list of candidate secondary cells) determined by the T-MN. The candidateCellInforListMN may be included in CGConfigInfo. The candidateCellInforListMN may include the current PSCell (current serving secondary cell) and the best neighbor secondary cell included in the NR measurement of the second measurement report. The step S711 may be an example of block S640.

According to a related art, there would have been steps L1003-L1004 for NR mobility performed in response to the first measurement report involved in the method. At step L1003, the S-SN sends an RRC Connection Reconfiguration to the terminal device. The RRC Connection Reconfiguration includes mobility control information for NR including only the information (cell identity) on the candidate new PSCell. At step L1004, the S-SN receives an RRC Connection Reconfiguration Complete from the terminal device. In other words, according to the related art, the S-SN will proceed with the NR mobility to change to the candidate new PSCell in response to receiving the first measurement report.

Figure 10:
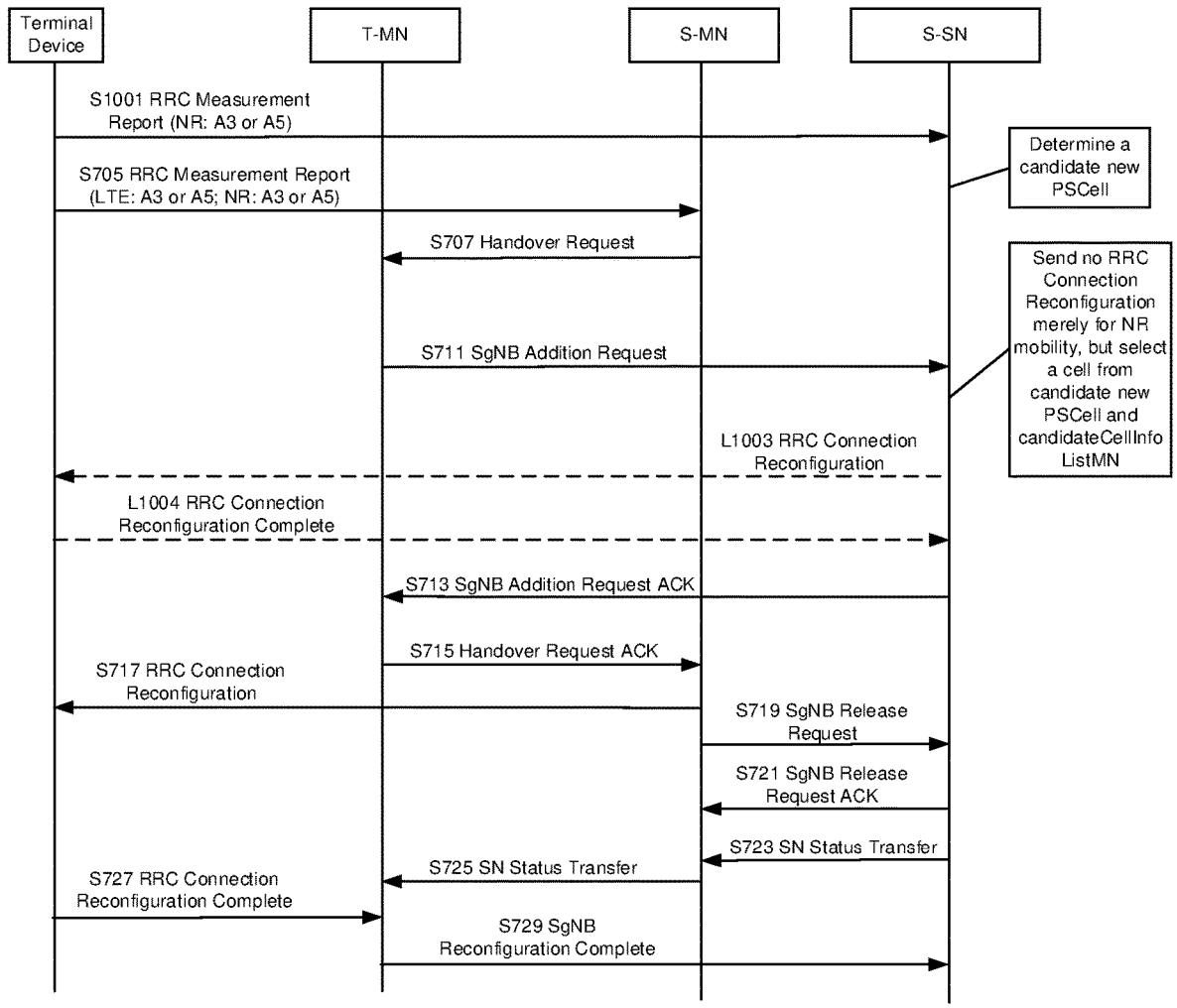
FIG. 10 is a flowchart showing an example of a method for connection reconfiguration for inter-master-node handover with intra-secondary-node handover with Signaling Radio Bearer for dual connectivity in a communication system according to an embodiment of the present disclosure.

Different from the related art, the method of the example shown in FIG. 10 does not include the steps L1003-L1004. Instead, even receiving the first measurement report from the terminal device, the S-MN ignores the first measurement report and does not actually proceed with the SN reconfiguration in response to the first measurement report. In other words, if the S-MN receives a first measurement report with NR measurement and then receives an SgNB Addition Request from the T-MN within a short period of time, the S-MN will suspend the SN reconfiguration. The short period of time may be equal to the time from the timing when the S-SN receives the first measurement report with NR measurement to the timing when the S-SN decides to send an RRC Connection Reconfiguration as at step L1003.

In addition, the S-SN triggers a PSCell change. More specifically, the PSCell change includes selecting a new PSCell as the new serving secondary cell from the candidate new PSCell determined previously by the S-SN as well as the secondary cells in the candidateCellInforListMN sent from the T-MN. In an example, the S-SN includes the new PSCell in an NR RRC configuration message in an X2AP message to be sent. This step may be an example of block S650. Then in S713, the S-SN sends an SgNB Addition Request ACK (SN reconfiguration request acknowledge) to the T-MN. The SgNB Addition Request ACK includes the new PSCell selected from the candidate new PSCell and the candidateCellInforListMN by the S-SN. The step S713 may be an example of block S660.

Other steps of FIG. 10 may be performed in the same way as for those shown in FIG. 7.

Although the example of FIG. 10 is shown with the inter-MN handover, the method shown in FIG. 10 can also be applied to intra-MN handover in a similar way. If the neighbor master cell (e.g. the best neighbor master cell), for which the measurement of the service quality is included in the LTE measurement of the second measurement report, is still supported by the S-MN, the MN handover is an intra-MN handover so that the S-MN and the T-MN are the same network device. In this case, the inter-MN signaling between the S-MN and the T-MN may be modified to become intra-MN signaling within the S-MN itself. More specifically, the step S707 may be modified to sending a Handover Request to the S-MN itself in response to the second measurement report, and the step S715 may be modified to receiving a Handover Request ACK from the S-MN itself. In the case of intra-MN handover with intra-SN handover, the SN reconfiguration request may be an SgNB Addition Request or an SgNB Modification Request, and the SN reconfiguration request acknowledge may be an SgNB Addition Request ACK or an SgNB Modification Request ACK.

In some examples, in the case of intra-MN handover (i.e., the T-MN and the S-MN are the same network device), intra-MN signaling within the S-MN itself may be omitted. More specifically, since the operations at steps S707 and S715 are a Handover Request and a Handover Request ACK between the S-MN and the T-MN, steps S707 and S715 may be omitted provided that intra-MN signaling within the S-MN itself is not necessary.

On the other hand, operations which should have been performed by the T-MN are now performed by the S-MN because the S-MN and the T-MN are the same network device for intra-MN handover. More specifically, step S711 may be modified to sending, by the S-MN, the SgNB Addition Request or the SgNB Modification Request (SN reconfiguration request) to the S-SN in response to receiving the Handover Request. In addition, step S713 may be modified to sending the SgNB Addition Request ACK or the SgNB Modification Request ACK (SN reconfiguration request acknowledge) to the S-MN. In addition, step S727 may be modified to receiving the RRC Connection Reconfiguration Complete by the S-MN, and step S729 may be modified to sending the SgNB Reconfiguration Complete by the S-MN.

After step S729, there may be other operations such as the T-MN sending an S1 Path Switch Request to the MME, the MME sending an S1 Path Switch Request ACK to the T-MN, the T-MN sending a UE Context Release to the S-MN, and the S-MN sending a UE Context Release to the S-SN.

Various embodiments and examples of methods for connection reconfiguration in dual connectivity have been described with reference to FIGS. 1-10.

According to some of the examples, instead of sending two separate RRC Connection Reconfiguration messages respectively in response to receiving the first and second measurement reports, only one RRC Connection Reconfiguration message which includes both the information on the SN reconfiguration and the information on the MN reconfiguration is sent to the terminal device. In this way, the resource allocated to signaling messages may be reduced, the burden on the terminal device may be alleviated, and the throughput of the communication system may be increased.

According to some of the examples, instead of performing an SN reconfiguration for the first time and then performing another SN reconfiguration for the second time along with an MN reconfiguration, the SN reconfiguration is performed only once. In this way, frequent handover operations may be avoided, and the efficiency of the communication system may be increased.

Although the second measurement report may include not only the measurement for the first RAT but also the measurement for the second RAT in some examples described in the above, the present disclosure is not limited to this. In some examples, it is possible that the second measurement report may only include the measurement for the first RAT.

Details which are less relevant to the concepts of the present disclosure have been omitted but can be found in 3GPP specifications, including but not limited to 3GPP TS 37.340 V 15.5, 3GPP TS 36.331 V 15.5, 3GPP TS 38.331 V 15.5 and 3GPP TS 36.423 V 15.5.

Figure 11:
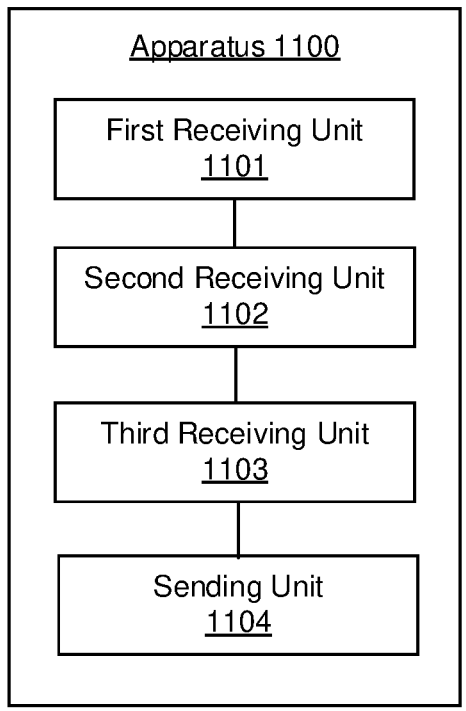
FIG. 11 is a block diagram of an apparatus at the side of a first master node according to an embodiment of the present disclosure.

Correspondingly to the method shown in FIG. 3 as described above, an apparatus (e.g. a network device as described in the above) at the side of the first MN can be provided. FIG. 11 is a block diagram of an apparatus 1100 according to an embodiment of the present disclosure. The apparatus 1100 may be, for example, a network device at a first master node in dual connectivity involving the first RAT and the second RAT. The first master node is operable under the first RAT. The apparatus 1100 can be, for example, the first master node which is an eNB or gNB, or a controller thereof.

As shown in FIG. 11, the apparatus 1100 includes a first receiving unit 1101, a second receiving unit 1102, a third receiving unit 1103 and a sending unit 1104. The first receiving unit 1101 is configured to receive a first measurement report for the second RAT from a terminal device. The second receiving unit 1102 is configured to receive a second measurement report for the first RAT from the terminal device. The third receiving unit 1103 is configured to receive, from a first secondary node, a secondary node reconfiguration message generated in response to the first measurement report, the first secondary node being operable according to the second RAT. The sending unit 1104 is configured to send, to the terminal device, a Radio Resource Control (RRC) Connection Reconfiguration message which includes information on master node reconfiguration under the first RAT and information on secondary node reconfiguration under the second RAT.

In an embodiment, the apparatus 1100 may further include a transferring unit configured to transfer the first measurement report to the first secondary node.

In an embodiment, the master node reconfiguration may include reconfiguration for master node handover from the first master node to a second master node. The second master node may be operable under the first RAT.

In an embodiment, the apparatus 1100 may further include a second sending unit configured to send a handover request to the second master node in response to the second measurement report, and a fourth receiving unit configured to receive a handover request acknowledge from the second master node. The handover request acknowledge may include the information on the secondary node reconfiguration.

In an embodiment, the secondary node reconfiguration may include reconfiguration for secondary node handover within the first secondary node. The information on the secondary node reconfiguration may include information on a new serving secondary cell of the first secondary node which is determined by the first secondary node.

In an embodiment, the secondary node reconfiguration may include reconfiguration for secondary node handover from the first secondary node to a second secondary node. The information on the secondary node reconfiguration may include information on a new serving secondary cell of the second secondary node which is determined by the second secondary node. The second secondary node may be operable under the second RAT.

In an embodiment, the first master node and the second master node may be a same network device.

In an embodiment, the master node reconfiguration may include reconfiguration for master node handover within the first master node.

In an embodiment, the secondary node reconfiguration may include reconfiguration for secondary node handover within the first secondary node. The information on the secondary node reconfiguration may include information on a new serving secondary cell of the first secondary node which is determined by the first secondary node.

In an embodiment, the second measurement report may include a measurement under the first RAT and a measurement under the second RAT. The apparatus 1100 may further include a third sending unit configured to send a secondary node reconfiguration request to the first secondary node in response to the second measurement report. The secondary node reconfiguration request may include a list of candidate secondary cells. The apparatus 1100 may further include a fifth receiving unit configured to receive a secondary node reconfiguration request acknowledge from the first secondary node. The secondary node reconfiguration request acknowledge may include the information on the new serving secondary cell.

In an embodiment, the secondary node reconfiguration may include reconfiguration for secondary node handover from the first secondary node to a second secondary node. The information on the secondary node reconfiguration may include information on a new serving secondary cell of the second secondary node which is determined by the second secondary node. The second secondary node may be operable under the second RAT.

In an embodiment, the second measurement report may include a measurement under the first RAT and a measurement under the second RAT. The apparatus 1100 may further include a fourth sending unit configured to send a secondary node reconfiguration request to the second secondary node in response to the second measurement report. The secondary node reconfiguration request may include a list of candidate secondary cells. The apparatus 1100 may further include a sixth receiving unit configured to receive a secondary node reconfiguration request acknowledge from the second secondary node. The secondary node reconfiguration request acknowledge may include the information on the new serving secondary cell.

In an embodiment, the apparatus 1100 sends, to the terminal device in response to the first measurement report, no RRC Connection Reconfiguration message which includes only the information on the secondary node reconfiguration under the second RAT without the information on the master node reconfiguration under the first RAT.

In an embodiment, the first RAT may be Long Term Evolution (LTE) system, and the second RAT may be New Radio (NR) system. In addition, the first measurement report may be included in a Radio Resource Control (RRC) Upper Link (UL) Information Transfer Multiple RAT Dual Connectivity (MRDC) message and may include a report of Event A3 or Event A5 under NR system. In addition, the second measurement report may be an RRC measurement report, and may include a report of Event A3 or Event A5 under LTE system and a report of Event A3 or Event A5 under NR system.

In an embodiment, the secondary node reconfiguration message may be an SgNB Modification Required message.

In an embodiment, the secondary node reconfiguration message may be an SgNB Change Required message.

In an embodiment, the secondary node reconfiguration request may be an SgNB Addition Request message or an SgNB Modification Request message, and the secondary node reconfiguration request acknowledge may be an SgNB Addition Request Acknowledge message or an SgNB Modification Request Acknowledge message.

In an embodiment, the secondary node reconfiguration request may be an SgNB Addition Request message, and the secondary node reconfiguration request acknowledge may be an SgNB Addition Request Acknowledge message.

The first receiving unit 1101, the second receiving unit 1102, the third receiving unit 1103 and the sending unit 1104 and other various units of the apparatus 1100 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., any of FIGS. 1-10.

Figure 12:
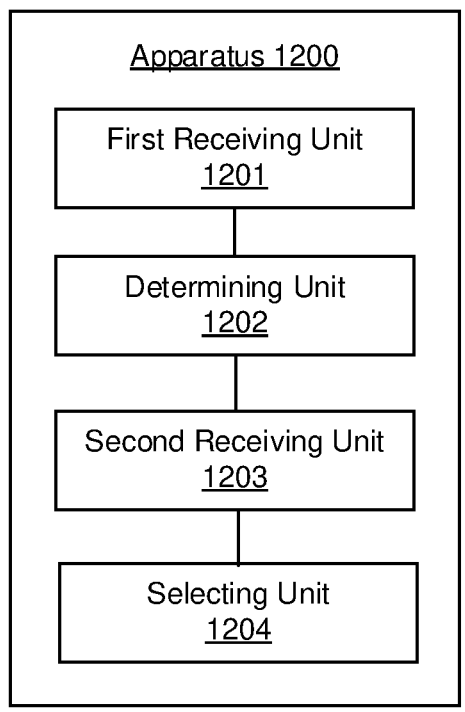
FIG. 12 is a block diagram of an apparatus at the side of a first secondary node according to an embodiment of the present disclosure.

Correspondingly to the method shown in FIG. 6 as described above, an apparatus at the side of the first SN can be provided. FIG. 12 is a block diagram of an apparatus (e.g. a network device as described in the above) 1200 according to an embodiment of the present disclosure. The apparatus 1200 may be, for example, a network device at the first secondary node in dual connectivity involving the first RAT and the second RAT. The first secondary node is operable under the second RAT. The apparatus 1200 can be, for example, the first secondary node which is an eNB or gNB, or a controller thereof.

As shown in FIG. 12, the apparatus 1200 includes a first receiving unit 1201, a determining unit 1202, a second receiving unit 1203 and a selecting unit 1204. The first receiving unit 1201 is configured to receive a first measurement report for the second RAT. The first measurement report is originated from a terminal device. The determining unit 1202 is configured to determine a candidate new serving secondary cell in response to the first measurement report. The second receiving unit 1203 is configured to receive, from a second master node, a secondary node reconfiguration request which includes a list of candidate secondary cells. The second master node is operable according to the first RAT. The selecting unit 1204 is configured to select a cell as a new serving secondary cell from the candidate new serving secondary cell and the list of candidate secondary cells.

In an embodiment, the apparatus 1200 may further include a sending unit configured to send a secondary node reconfiguration message to a first master node in response to the first measurement report. The first master node may be operable according to the first RAT.

In an embodiment, the apparatus 1200 may avoid sending an error notice to the first master node, if no secondary node reconfiguration request is received from the first master node in response to the secondary node reconfiguration message.

In an embodiment, the apparatus 1200 may send, to the terminal device in response to the first measurement report, no Radio Resource Control (RRC) Connection Reconfiguration message which includes the information on the secondary node reconfiguration.

In an embodiment, the apparatus 1200 may further include a second sending unit configured to send a secondary node reconfiguration request acknowledge to the second master node. The secondary node reconfiguration request acknowledge may include the information on the selected new serving secondary cell.

In an embodiment, the first master node and the second master node may be a same network device.

The first receiving unit 1201, the determining unit 1202, the second receiving unit 1203 and the selecting unit 1204 and other various units of the apparatus 1200 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., any of FIGS. 6-10.

Figure 13:
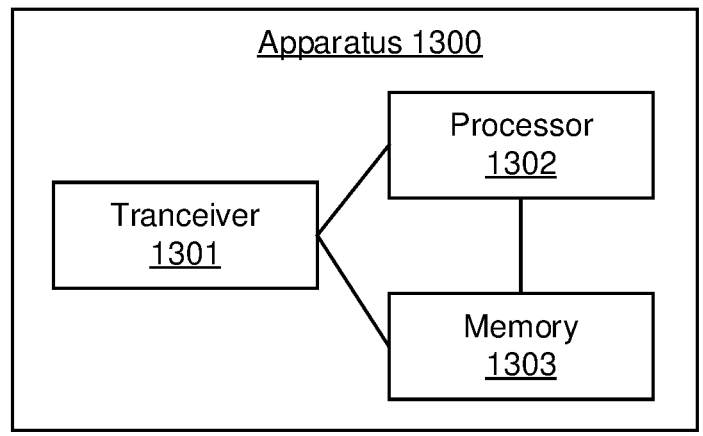
FIG. 13 is a block diagram of an apparatus at the side of a first master node according to another embodiment of the present disclosure.

FIG. 13 is a block diagram of an apparatus 1300 at the side of the first master node according to another embodiment of the present disclosure. The apparatus 1300 may be, for example, a network device as described in the above, and can be, for example, the first master node which is an eNB or gNB, or a controller thereof.

The apparatus 1300 includes a transceiver 1301, a processor 1302 and a memory 1303. The memory 1303 contains instructions executable by the processor 1302 whereby the apparatus 1300 is operative to perform the actions, e.g., of the procedure described earlier in conjunction with any of FIGS. 1-10. Particularly, the memory 1303 contains instructions executable by the processor 1302 whereby the apparatus 1300 is operative to: receive a first measurement report for the second RAT, the first measurement report being originated from a terminal device; determine a candidate new serving secondary cell in response to the first measurement report; receive, from a second master node, a secondary node reconfiguration request which includes a list of candidate secondary cells, the second master node being operable according to the first RAT; and select a cell as a new serving secondary cell from the candidate new serving secondary cell and the list of candidate secondary cells.

In some embodiments, the memory 1303 may further contain instructions executable by the processor 1302 whereby the apparatus 1300 is operative to perform any of the aforementioned methods, steps, and processes.

Figure 14:
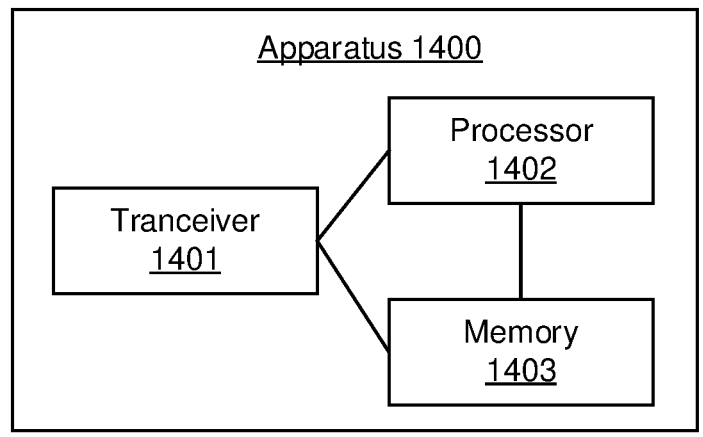
FIG. 14 is a block diagram of an apparatus at the side of a first secondary node according to another embodiment of the present disclosure.

FIG. 14 is a block diagram of an apparatus 1400 at the side of the first secondary node according to another embodiment of the present disclosure. The apparatus 1400 may be, for example, a network device as described in the above, and can be, for example, the first secondary node which is an eNB or gNB, or a controller thereof.

The apparatus 1400 includes a transceiver 1401, a processor 1402 and a memory 1403. The memory 1403 contains instructions executable by the processor 1402 whereby the apparatus 1400 is operative to perform the actions, e.g., of the procedure described earlier in conjunction with any of FIGS. 6-10. Particularly, the memory 1403 contains instructions executable by the processor 1402 whereby the apparatus 1400 is operative to: receive a first measurement report for the second RAT, the first measurement report being originated from a terminal device; determine a candidate new serving secondary cell in response to the first measurement report; receive, from a second master node, a secondary node reconfiguration request which includes a list of candidate secondary cells, the second master node being operable according to the first RAT; and select a cell as a new serving secondary cell from the candidate new serving secondary cell and the list of candidate secondary cells.

In some embodiments, the memory 1403 may further contain instructions executable by the processor 1402 whereby the apparatus 1400 is operative to perform any of the aforementioned methods, steps, and processes.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1302 or 1402 causes the apparatus 1000 to perform the actions, e.g., of the procedure described earlier in conjunction with any of FIGS. 1-10.

The computer program product may be configured as a computer program code structured in computer program modules. The computer program modules could essentially perform the actions of the flow illustrated in any of FIGS. 1-10.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read- Only Memory (ROM), or an EEPROM, and the computer program modules described above could in alternative embodiments be distributed on different computer program products in the form of memories.

Figure 15:
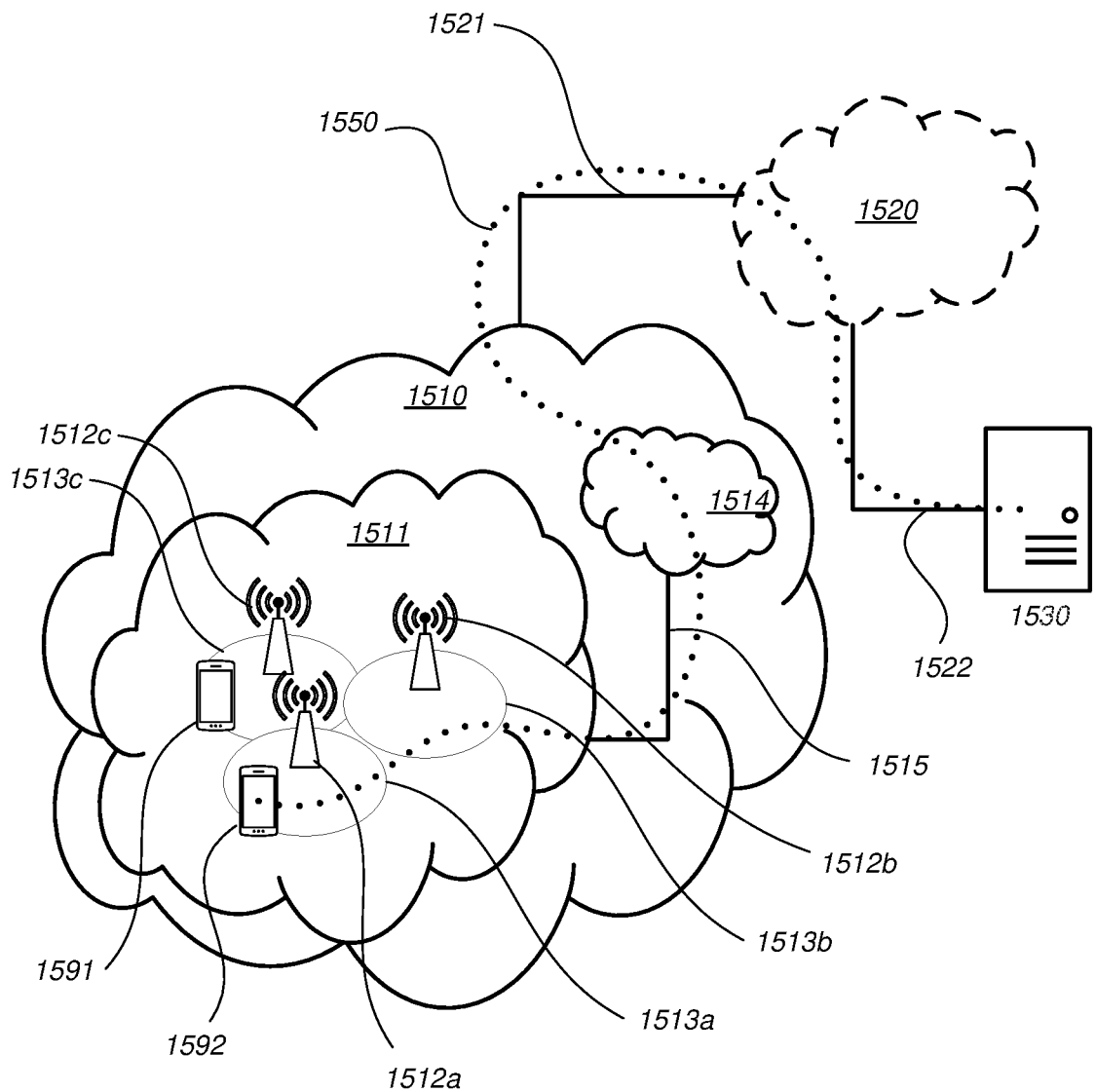
FIG. 15 schematically illustrates a telecommunication network connected via an intermediate network to a host computer.

With reference to FIG. 15, in accordance with an embodiment, a communication system includes a telecommunication network 1510, such as a 3GPP-type cellular network, which comprises an access network 1511, such as a radio access network, and a core network 1514. The access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to the core network 1514 over a wired or wireless connection 1515. A first user equipment (UE) 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to a host computer 1530, which may be embodied in the hardware and/or software of a standalone server, a cloud-implemented server, a distributed server or as processing resources in a server farm. The host computer 1530 may be under the ownership or control of a service provider, or may be operated by the service provider or on behalf of the service provider. The connections 1521, 1522 between the telecommunication network 1510 and the host computer 1530 may extend directly from the core network 1514 to the host computer 1530 or may go via an optional intermediate network 1520. The intermediate network 1520 may be one of, or a combination of more than one of, a public, private or hosted network; the intermediate network 1520, if any, may be a backbone network or the Internet; in particular, the intermediate network 1520 may comprise two or more sub-networks (not shown).

The communication system of FIG. 15 as a whole enables connectivity between one of the connected UEs 1591, 1592 and the host computer 1530. The connectivity may be described as an over-the-top (OTT) connection 1550. The host computer 1530 and the connected UEs 1591, 1592 are configured to communicate data and/or signaling via the OTT connection 1550, using the access network 1511, the core network 1514, any intermediate network 1520 and possible further infrastructure (not shown) as intermediaries. The OTT connection 1550 may be transparent in the sense that the participating communication devices through which the OTT connection 1550 passes are unaware of routing of uplink and downlink communications. For example, a base station 1512 may not or need not be informed about the past routing of an incoming downlink communication with data originating from a host computer 1530 to be forwarded (e.g., handed over) to a connected UE 1591. Similarly, the base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In a communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, application-specific integrated circuits, field programmable gate arrays or combinations of these (not shown) adapted to execute instructions. The host computer 1610 further comprises software 1611, which is stored in or accessible by the host computer 1610 and executable by the processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least a wireless connection 1670 with a UE 1630 located in a coverage area (not shown in FIG. 16) served by the base station 1620. The communication interface 1626 may be configured to facilitate a connection 1650 to the host computer 1610. The connection 1650 may be direct or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, application-specific integrated circuits, field programmable gate arrays or combinations of these (not shown) adapted to execute instructions. The base station 1620 further has software 1621 stored internally or accessible via an external connection.

The communication system 1600 further includes the UE 1630 already referred to. Its hardware 1635 may include a radio interface 1637 configured to set up and maintain a wireless connection 1670 with a base station serving a coverage area in which the UE 1630 is currently located. The hardware 1635 of the UE 1630 further includes processing circuitry 1638, which may comprise one or more programmable processors, application-specific integrated circuits, field programmable gate arrays or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via the UE 1630, with the support of the host computer 1610. In the host computer 1610, an executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

Figure 16:
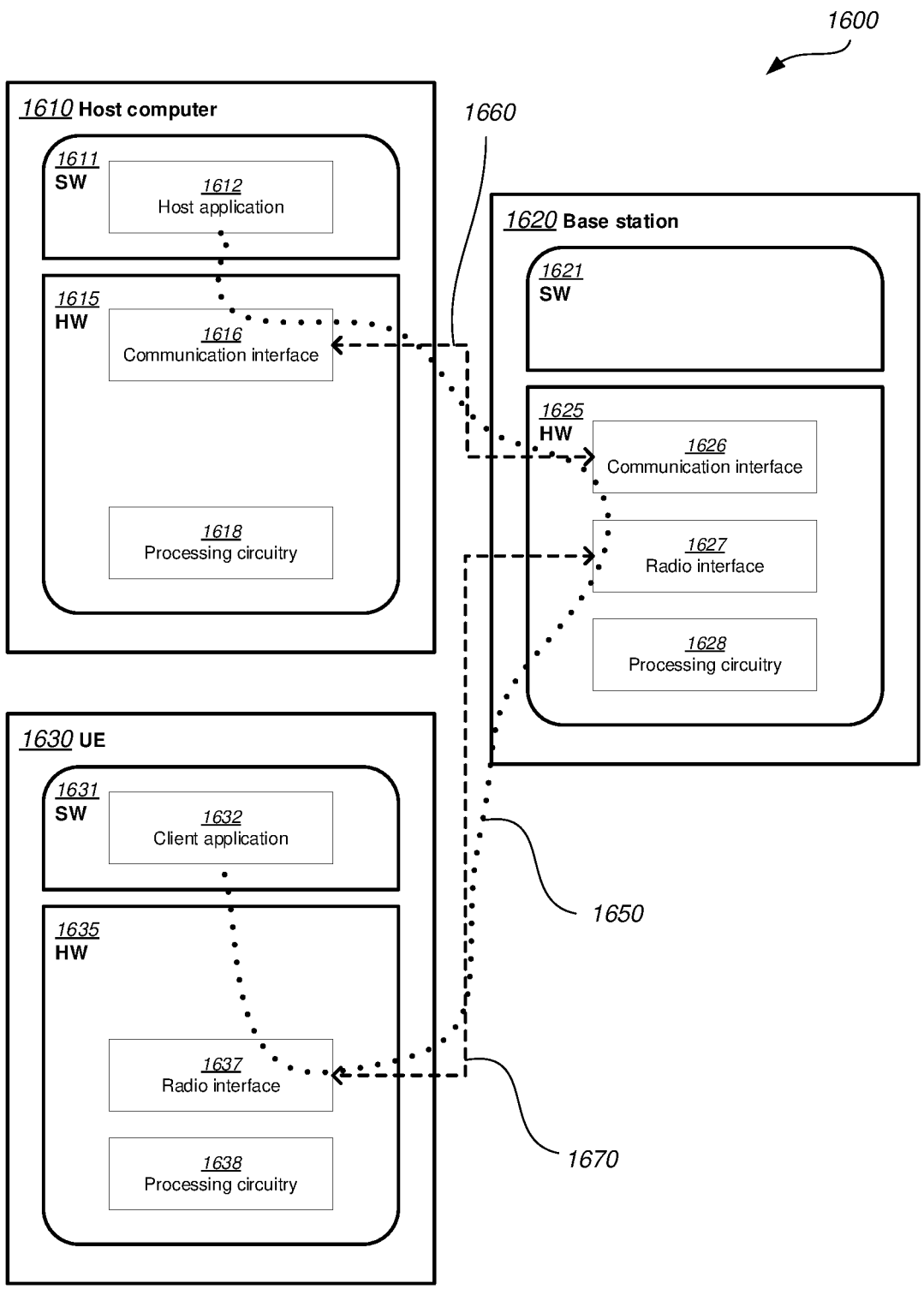
FIG. 16 is a generalized block diagram of a host computer communicating via a base station with a user equipment over a partially wireless connection.

It is noted that the host computer 1610, base station 1620 and UE 1630 illustrated in FIG. 16 may be identical to the host computer 1530, one of the base stations 1512*a*, 1512*b*, 1512*c* and one of the UEs 1591, 1592 of FIG. 15, respectively. This is to say, the inner workings of these entities may be as shown in FIG. 16 and independently, the surrounding network topology may be that of FIG. 15.

In FIG. 16, the OTT connection 1650 has been drawn abstractly to illustrate the communication between the host computer 1610 and the use equipment 1630 via the base station 1620, without explicit reference to any intermediary devices and the precise routing of messages via these devices. Network infrastructure may determine the routing, which it may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment. More precisely, the teachings of these embodiments may improve the data throughput and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1650 between the host computer 1610 and UE 1630, in response to variations in the measurement results. The measurement procedure and/or the network functionality for reconfiguring the OTT connection 1650 may be implemented in the software 1611 of the host computer 1610 or in the software 1631 of the UE 1630, or both. In embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of the OTT connection 1650 may include message format, retransmission settings, preferred routing etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer's 1610 measurements of throughput, propagation times, latency and the like. The measurements may be implemented in that the software 1611, 1631 causes messages to be transmitted, in particular empty or 'dummy' messages, using the OTT connection 1650 while it monitors propagation times, errors etc.

Figures 17, 18:
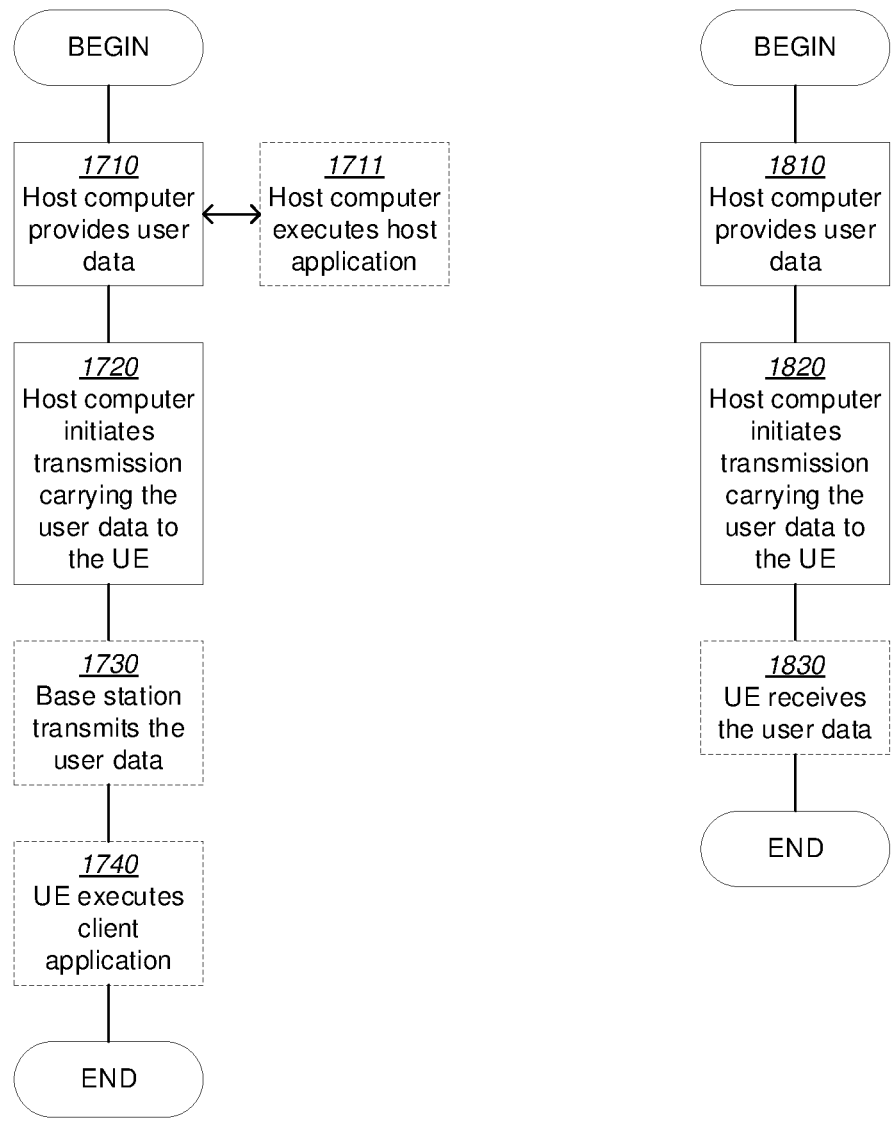

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 1710 of the method, the host computer provides user data. In an optional substep 1711 of the first step 1710, the host computer provides the user data by executing a host application. In a second step 1720, the host computer initiates a transmission carrying the user data to the UE. In an optional third step 1730, the base station transmits to the UE the user data which was carried in the transmission that the host computer initiated, in accordance with the teachings of the embodiments described throughout this disclosure. In an optional fourth step 1740, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 1810 of the method, the host computer provides user data. In an optional substep (not shown) the host computer provides the user data by executing a host application. In a second step 1820, the host computer initiates a transmission carrying the user data to the UE. The transmission may pass via the base station, in accordance with the teachings of the embodiments described throughout this disclosure. In an optional third step 1830, the UE receives the user data carried in the transmission.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 1910 of the method, the UE receives input data provided by the host computer. Additionally or alternatively, in an optional second step 1920, the UE provides user data. In an optional substep 1921 of the second step 1920, the UE provides the user data by executing a client application. In a further optional substep 1911 of the first step 1910, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1930, transmission of the user data to the host computer. In a fourth step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 2010 of the method, in accordance with the teachings of the embodiments described throughout this disclosure, the base station receives user data from the UE. In an optional second step 2020, the base station initiates transmission of the received user data to the host computer. In a third step 2030, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method at a first master node in dual connectivity involving a first Radio Access Technology (RAT) and a second RAT, the first master node being operable under the first RAT, the method comprising:
receiving a first measurement report for the second RAT from a terminal device;
receiving a second measurement report for the first RAT from the terminal device;
receiving from a first secondary node, a secondary node reconfiguration message generated in response to the first measurement report, the first secondary node being operable according to the second RAT; and
sending, to the terminal device, a Radio Resource Control (RRC) Connection Reconfiguration message which includes information on master node reconfiguration under the first RAT and information on secondary node reconfiguration under the second RAT, wherein
the secondary node reconfiguration comprises reconfiguration for secondary node handover within the first secondary node, and
the information on the secondary node reconfiguration includes information on a new serving secondary cell of the first secondary node which is determined by the first secondary node.

2. The method according to claim 1, further comprising: transferring the first measurement report to the first secondary node.

3. The method according to claim 1, wherein the master node reconfiguration comprises reconfiguration for master node handover from the first master node to a second master node, the second master node being operable under the first RAT.

4. The method according to claim 3, further comprising:
sending a handover request to the second master node in response to the second measurement report; and
receiving a handover request acknowledge from the second master node, the handover request acknowledge including the information on the secondary node reconfiguration.

5. The method according to claim 3, wherein
the secondary node reconfiguration comprises reconfiguration for secondary node handover within the first secondary node, and
the information on the secondary node reconfiguration includes information on a new serving secondary cell of the first secondary node which is determined by the first secondary node.

6. The method according to claim 3, wherein
the secondary node reconfiguration comprises reconfiguration for secondary node handover from the first secondary node to a second secondary node, the second secondary node being operable under the second RAT, and
the information on the secondary node reconfiguration includes information on a new serving secondary cell of the second secondary node which is determined by the second secondary node.

7. The method according to claim 1, wherein
the second measurement report includes a measurement under the first RAT and a measurement under the second RAT, and
the method further comprises:
sending, to the first secondary node, a secondary node reconfiguration request which includes a list of candidate secondary cells in response to the second measurement report; and
receiving, from the first secondary node, a secondary node reconfiguration request acknowledge which includes the information on the new serving secondary cell.

8. The method according to claim 1, wherein
the secondary node reconfiguration comprises reconfiguration for secondary node handover from the first secondary node to a second secondary node, the second secondary node being operable under the second RAT, and
the information on the secondary node reconfiguration includes information on a new serving secondary cell of the second secondary node which is determined by the second secondary node.

9. The method according to claim 8, wherein
the second measurement report includes a measurement under the first RAT and a measurement under the second RAT, and
the method further comprises:
sending, to the second secondary node, a secondary node reconfiguration request which includes a list of candidate secondary cells in response to the second measurement report; and
receiving, from the second secondary node, a secondary node reconfiguration request acknowledge which includes the information on the new serving secondary cell.

10. The method according to claim 1, further comprising:
sending, to the terminal device in response to the first measurement report, no RRC Connection Reconfiguration message which includes only the information on the secondary node reconfiguration under the second RAT without the information on the master node reconfiguration under the first RAT.

11. The method according to claim 1, wherein
the first RAT is Long Term Evolution (LTE) system, and the second RAT is New Radio (NR) system,
the first measurement report is included in a Radio Resource Control (RRC) Upper Link (UL) Information Transfer Multiple RAT Dual Connectivity (MRDC) message and comprises a report of Event A3 or Event A5 under NR system, and
the second measurement report is an RRC measurement report, and comprises a report of Event A3 or Event A-5 under LTE system and a report of Event A3 or Event A-5 under NR system.

12. The method according to claim 1, wherein the secondary node reconfiguration message is an SgNB Modification Required message.

13. The method according to claim 1, wherein the secondary node reconfiguration message is an SgNB Change Required message.

14. The method according to claim 7, wherein
the secondary node reconfiguration request is an SgNB Addition Request message or an SgNB Modification Request message, and the secondary node reconfiguration request acknowledge is an SgNB Addition Request Acknowledge message or an SgNB Modification Request Acknowledge message.

15. The method according to claim 9, wherein
the secondary node reconfiguration request is an SgNB Addition Request message, and the secondary node reconfiguration request acknowledge is an SgNB Addition Request Acknowledge message.

16. A method at a first secondary node in dual connectivity involving a first Radio Access Technology (RAT) and a second RAT, the first secondary node being operable under the second RAT, the method comprising:

receiving a first measurement report for the second RAT, the first measurement report being originated from a terminal device;

determining a candidate new serving secondary cell in response to the first measurement report;

receiving, from a second master node, a secondary node reconfiguration request which includes a list of candidate secondary cells, the second master node being operable according to the first RAT; and selecting a cell as a new serving secondary cell from the candidate new serving secondary cell and the list of candidate secondary cells.

17. The method according to claim 16, further comprising:

sending, to a first master node, a secondary node reconfiguration message in response to the first measurement report, the first master node being operable according to the first RAT.

18. The method according to claim 16, further comprising:

sending, to the terminal device in response to the first measurement report, no Radio Resource Control (RRC) Connection Reconfiguration message which includes the information on the secondary node reconfiguration.

19. The method according to claim 16, further comprising:

sending, to the second master node, a secondary node reconfiguration request acknowledge which includes the information on the selected new serving secondary cell.

* * * * *